United States Patent
Ishigaki et al.

(10) Patent No.: US 6,615,710 B1
(45) Date of Patent: Sep. 9, 2003

(54) SCREW PRESS APPARATUS

(75) Inventors: Eiichi Ishigaki, Kagawa (JP); Yukitoshi Mitani, Kagawa (JP)

(73) Assignee: Ishigaki Company Limited, Tokyo (JP)

(*) Notice: Subject to any disclaimer, the term of this patent is extended or adjusted under 35 U.S.C. 154(b) by 0 days.

(21) Appl. No.: 09/868,898

(22) PCT Filed: Nov. 30, 1999

(86) PCT No.: PCT/JP99/06707
§ 371 (c)(1), (2), (4) Date: Jul. 9, 2001

(87) PCT Pub. No.: WO01/39965
PCT Pub. Date: Jun. 7, 2001

(51) Int. Cl.⁷ .............. B30B 9/06; B30B 15/00
(52) U.S. Cl. ............ 100/111; 100/99; 100/48; 100/112; 100/147; 100/148
(58) Field of Search ............ 100/99, 110, 111, 100/117, 127, 129, 145, 147, 148, 112, 48

(56) References Cited

U.S. PATENT DOCUMENTS

| | | | | |
|---|---|---|---|---|
| 3,747,886 A | * | 7/1973 | Carlson et al. ........ | 248/325 |
| 4,273,035 A | | 6/1981 | Cusi ................... | 100/37 |
| 5,021,166 A | * | 6/1991 | Torpey ................ | 100/152 |
| 5,122,263 A | * | 6/1992 | Huber ................. | 100/117 |
| 5,275,740 A | * | 1/1994 | Spyker et al. ......... | 100/45 |
| 5,357,855 A | * | 10/1994 | Ishigaki et al. ....... | 100/112 |

FOREIGN PATENT DOCUMENTS

| | | | | |
|---|---|---|---|---|
| EP | 0565714 | | 10/1993 | |
| JP | 4-105795 | | 4/1992 | |
| JP | 04118198 A | * | 4/1992 | ....... B30B/9/14 |
| JP | 4-157096 | | 5/1992 | |
| JP | 04238699 A | * | 8/1992 | ....... B03B/9/12 |
| JP | 7-40086 | | 2/1995 | |
| JP | 07204895 A | * | 8/1995 | ....... B30B/9/14 |
| JP | 7-214382 | | 8/1995 | |
| JP | 8-1390 | | 1/1996 | |
| JP | 8-19707 | | 1/1996 | |
| JP | 10-34196 | | 2/1998 | |
| JP | 10192900 A | * | 7/1998 | ....... C02F/11/14 |
| JP | 11324100 A | * | 11/1999 | ....... E03F/7/10 |

OTHER PUBLICATIONS

English Language Abstract of JP 10–34196.
English Language Abstract of JP 7–214382.
English Language Abstract of JP 8–1390.
English Language Abstract of JP 7–40086.
English Language Abstract of JP 8–19707.
English Language Abstract of JP 4–157096.
English Language Abstract of JP 4–105795.

\* cited by examiner

*Primary Examiner*—Allen Ostrager
*Assistant Examiner*—Jimmy T Nguyen
(74) *Attorney, Agent, or Firm*—Greenblum & Bernstein, P.L.C.

(57) ABSTRACT

A screw press apparatus has frames, a screw shaft, an outside tube, a cylindrical screen, a screw blade, a supply pipe, and a cleaning pipe. The screen is fixed between the frames to the outside tube, and has a plurality of fine holes and covers the screw shaft. The screw shaft and the screen define a cylindrical space continuously extending from an upstream region to a downstream region. Raw liquid is fed from the supply pipe via an opening of the screw shaft to the upstream region of the cylindrical space. The cleaning pipe ejects cleaning water onto the screen. Sizes of the fine holes of the screen decrease gradually from the upstream region towards the downstream region.

23 Claims, 12 Drawing Sheets

SCREW PRESS APPARATUS

TECHNICAL FIELD

The present invention relates to an improvement of a screw press apparatus to be used for dehydration such as of sludge, and particularly, it relates to a structure for enhancing a filtering function of a screw press and a structure for eliminating blocking of a screen.

BACKGROUND ART

A typical screw press apparatus has an outside tube and a screw shaft disposed in the outside tube. Raw liquid is fed between the outside tube and the screw shaft, ad is dehydrated and compressed by rotation of the screw shaft, to be separated into solid and liquid.

As the raw liquid is concentrated, getting sludgy, and is further dehydrated, forming a cake, the load of a driving device for rotating the screw shaft increases, so that the cake may not be compressed sufficiently.

The outside tube is covered with a metallic screen low of pressure resistance. In the case where adhesive foul water or the like is dehydrated, high pressure resistance is required, and thus the metallic screen is reinforced with a ring, a flange or the like. Moreover, since the mesh of the metallic screen, which processes adhesive slurry, is generally fine, the screen tends to be clogged and thus it is necessary to clean the screen.

The clogged screen is cleaned by a brushing or by a blowing with compressed air. However, as it is difficult to uniformly apply a brush and a blow of compress air to the screen due to the presence of reinforcing flange or the like, and as the screen has uniformly fine meshes, there is a possibility that the screen may not be cleaned sufficiently.

DISCLOSURE OF THE INVENTION

A principal object of the present invention is to provide a screw press apparatus in which the structure for supplying raw liquid and the structure of a screen are improved, so that a dehydrating process exhibits an enhanced performance, and the screen has a reduced load thereon in a dehydration process for sludge, effecting a facilitated sufficient elimination of a blocking of the screen.

Another object of the invention is to provide a control device implemented for load reduction to be effected on a rotary drive for a screw shaft in a dehydration process for slurry.

To achieve the object, a screw press apparatus according to a first aspect of the invention comprises a first and a second frame (3, 4) in opposition to each other, an outside tube (5) having a screen (8) on its peripheral surface, a screw shaft (6) having a spiral screw blade (13), a supply pipe (16) for supplying raw liquid in the screwshaft (6), and a cleaning pipe (34) for ejecting cleaning water to the screen (8). The outside tube (5) is supported on the frames (3, 4). The screw shaft (6) is inserted through the outside tube (5) and is supported rotatably on the frames (3, 4). The supply pipe (16) is fixed to one end (6a) of the screw shaft (6) supported on the first frame (3). The screen (8) is disposed between the frames (3, 4) and has a plurality of fine holes (74). The screw shaft (6) and the screen (8) define a cylindrical space (70) continuously extending from an upstream region (71) at a side of the first frame (3) to a downstream region (72) at a side of the second frame (4). The screw blade (13) is projected from the screw shaft (6) into the cylindrical space (70) and continuously extends from the upstream region (71) to the downstream region (72). An opening (73) for supplying the raw liquid from the supply pipe (16) to the upstream region (71) of the cylindrical space (70) is formed in the screw shaft (6). An outer peripheral surface of the screw shaft (6) and an inner peripheral surface of the screen (8) have a relative distance therebetween, which decreases from the upstream region (71) towards the downstream region (72). Raw liquid fed from the opening (73) to the upstream region (71) is pressurized and carried towards the downstream region (72) by the screw blade (13), while being separated into filtrate allowed to flows through the fine holes (74) out of the screen (8) and a cake allowed to move in the cylindrical space (7), to be discharged from the downstream region (72). Sizes of the fine holes (74) of the screen (8) decrease gradually from the upstream region (71) towards the downstream region (72).

According to the above arrangement, the raw liquid fed from the opening (73) of the screw shaft (6) to the upstream region (71) of the cylindrical space (70) is carried towards the downstream region (72) by the screw blade (13). The relative distance between the outer peripheral surface of the screw shaft (6) and the inner peripheral surface of the screen (8) corresponds to a radial width of the cylindrical space (70). As the width decreases from the upstream region (71) towards the downstream region (72), the raw liquid is carried and simultaneously pressurized gradually, and the filtrate flows through the fine holes (74) out of the screen (8), to be concentrated. R raw liquid in the cylindrical space (70) becomes sludge in an intermediate stage, and is further concentrated to form the cake, to be finally discharged from the downstream region (72). Namely, raw liquid is separated into the filtrate which flows out of the fine holes (74) and the cake which is discharged from the downstream region (72).

Since the opening (73) for supplying raw liquid is formed in the screw shaft (6), the raw liquid is fed in free of influences from the screw blade (13). Therefore, even if soft flocs cohered by a cohesive agent is mixed in the raw liquid, the flocs are hardly broken, assuring a dehydration performance free of damages.

The sizes of the fine holes (74) of the screen (8) decrease gradually from the upstream region (71) towards the downstream region (72). On the contrary, the pressure acting on the raw liquid in the cylindrical space (70) rises gradually from the upstream region (71) where the radial width is large towards the downstream region (72) where the radial width is small. For this reason, in the upstream region (71) low of pressure, the filtrate flows out of the large fine holes (74) satisfactorily. Moreover, since the fine holes (74) become smaller gradually towards the downstream region (72) high of pressure, where sludge is changed to a cake, the sludge hardly flows out of the fine holes (74) and thus only the filtrate outflows satisfactorily. Therefore, raw liquid is separated into the filtrate and the cake satisfactorily, and thus the filtering performance is improved.

In the case where the screen (8) is blocked, cleaning water is ejected from the cleaning pipe (34) to the screen (8), and thus the screen (8) is reusable.

A second aspect of the invention provides a screw press apparatus depending from the first aspect, which further comprises a scraper (14) fixed to the screw blade (13). The scraper (14) is continuously extends from the upstream region (71) to the downstream region (72) and contacts elastically on the screen (8).

According to this arrangement, since sludge is scrapped off from the fine holes (74) of the screen (8) periodically by the scraper (14), the blocking of the screen (14) is prevented previously in a whole region covering from the upstream region (71) to the downstream region (72).

The scraper (14) extends continuously from the upstream region (71) to the downstream region (72), and in comparison to a case where a scraper is disposed partially, the positioning is facilitated, with a reduced tendency to have positional deviation.

A third aspect of the invention provides a screw press apparatus depending from the first aspect, which further comprises a claw (28) fixed to the supply pipe (16), a first movable claw (31) provided on the outside tube (5) in correspondence to the claw (28), a first spring (30) for biasing the first movable claw (31), a first guide surface (75) provided on at least one of the claw (28) and the first movable claw (31), to work when the screw shaft (6) rotates in a forward direction, a stopper (33) fixed to the second frame (4), a second movable claw (78) disposed on the outside tube (5) in correspondence to the stopper (33), a second spring (77) for biasing the second movable claw (78), and a second guide surface (79) provided on at least one of the stopper (33) and the second movable claw (78), to work when the screw shaft (6) rotates in a reverse direction. The outside tube (5) is supported rotatably on the frames (3, 4). The first spring (30) biases the first movable claw (31) within a range where the claw (28) moves according to the rotation of the screw shaft (6). The second spring (77) biases the second movable claw (78) within a range where the stopper (33) moves according to a rotation of the outside tube (5). When the screw shaft (6) rotates in the forward direction, the first movable claw (31) is adapted by a guiding of the first guide surface (75), to move out of the moving range of the claw (28) against the biasing force of the first spring (30),allowing a relative rotation of the outside tube (5) with respect to the screw shaft (6), and the second movable claw (78) is adapted by the biasing force of the second spring (77), to engage with the stopper (33), preventing the relative rotation of the outside tube (5) with respect to the frames (3, 4). As a result, the screen (8) is held in a stopped state relative to the frames (3, 4), and raw liquid is pressurized and carried from the upstream region (71) to the downstream region (72). When the screw shaft (6) rotates in the reverse direction, the first movable claw (31) is adapted by the biasing force of the first spring (30), to engage with the claw (28), preventing the relative rotation of the outside tube (5) with respect to the screw shaft (6), and the second movable claw (78) is adapted by a guiding of the second guide surface (79), to move out of the moving range of the stopper (33) against the biasing force of the second spring (77), allowing a relative rotation of the outside tube (5) with respect to the frames (3, 4). As a result, the outside tube (5) rotates integrally with the screw shaft (6). According to this arrangement, in a normal filtering operation, the drive (25) rotates the screw shaft (6) in the forward direction. As the screw shaft (6) is forward rotated, the first movable claw (31) is not engaged with the claw (28), allowing a relative rotation of the outside tube (5) to the screw shaft (6), and the second movable claw (78) engages with the stopper (33), preventing the relative rotation of the outside tube (5) to the frames (3, 4). Thereby, with the screen (8) in a stopped state relative to the frames (3, 4), the screw blade (13) rotates relative to the screen (8), and raw liquid is carried under pressure, from the upstream region (71) to the downstream region (72).

In a cleaning operation, the drive (25) makes the screw shaft (6) rotate in a reverse direction. As the screw shaft (6) is reverse rotated, the first movable claw (31) engages with the claw (28), preventing the relative rotation of the outside tube (5) to the screw shaft (6), and the second movable claw (78) is not engaged with the stopper (33), allowing a relative rotation of the outside tube (5) to the frames (3, 4). Thereby, the outside tube (5) and the screen (8) are rotated integrally with the screw shaft (6), and compressed sludge in the cylindrical space (70) is fed back. Under such a condition, cleaning water is ejected from the cleaning pipe (34) to the screen (8), so that a whole peripheral region of the screen (8) is well washed to be reusable.

A fourth aspect of the invention provides a screw press apparatus depending from the first aspect, which further comprises a pump (59) for supplying the raw liquid, a supply path (60) for interconnecting the supply pipe (16) and the pump (59),and a coagulant mixing tank (39) provided in the supply path (60). The coagulant mixing tank (39) has a tank body (81), an upper cover (82), a gland box (48), a gland packing (46), a seal pipe (51), and an agitation shaft (40). The tank body (81) has an opening (83), a raw liquid inlet (84), a raw liquid outlet (44), and a cohesive agent supply opening (86). The raw liquid outlet (44) is disposed below the opening (83). The raw liquid inlet (84) and the cohesive agent supply opening (86) are disposed below the raw liquid outlet (44). The opening (83) is covered with the upper cover (82). The upper cover (82) has a through hole (88) into which the gland box (48) is fitted. The agitation shaft (40) is inserted through the gland box (48). The glad packing (46) performs a sealing between the agitation shaft (40) and the gland box (48). The agitation shaft (40) has an agitating blade (42) disposed below the raw liquid outlet (44) in the tank body (81). The sealed pipe (51) extends from a lower end of the gland box (48) to cover the agitation shaft (40). A lower end (51a) of the sealed pipe (51) is dipped in raw liquid in the tank body (81).

According to this arrangement, supplied raw liquid from the pump (59) inflows via the raw liquid inlet (84) to the tank body (81). In the tank body (81), raw liquid is mixed by the agitating blade (42) with the cohesive agent supplied from the cohesive agent supply opening (86). By the mixing of raw liquid and cohesive agent, there are produced flocs. Raw liquid containing the flocs is sent from the raw liquid outlet (44) to the supply pipe (16).

As pulsatory actions generated at the pump (59) are moderated with compressive air in the tank body (81), flocs in raw liquid are supplied via the supply pipe (16) into the cylindrical space (70), without destruction.

Further, the opening (83) of the tank body (81) is closed by the upper cover (82), the gland box (48) is fitted in the through hole (88) of the upper cover (82), and the agitation shaft (40) is inserted through the glad box (48). Between the agitation shaft (40) and the glad box (48) is sealed with the glad packing (46), and the lower end (51a) of the shield pipe (51) extending from a lower end of the glad box (48) to cover the agitation shaft (40) is submerged in raw liquid in the tank body (81). Therefore, inside the tank body (81) is kept sealed, so that air in the tank body (81) can exhibit a desirable compression property.

Incidentally, the pressure for charging raw liquid into the screw press may be set to 0.05 to 0.5 kg/cm$^2$ (approx. 4.9 to 49 kPa), for raw liquid to be free of occurrence of leakage as well, and to achieve a deodorizing effect even in the case of a processing such as of sewage.

A fifth aspect of the invention provides a crew press apparatus depending from the first aspect, which further comprises a drive (25) for driving the screw shaft (6), a torque detector (52) provided for the drive (25), and a control unit (89) for controlling the drive (25) in accordance with detected torque detected by the torque detector (52).

According to this arrangement, as the imposed load on the drive (25) varies with a changed state of raw liquid in the cylindrical space (70), the detected torque by the torque detector (52) changes. The control unit (89) is adapted to then control the drive (25) in dependence on a variation of detected torque. Therefore, raw liquid in the cylindrical space (70) has a stable state, giving a stable state to the cake to be discharged.

A sixth aspect of the invention provides a screw press apparatus depending from the fifth aspect, in which the control unit (89) has a comparator (53) and a controller (54). The drive (25) comprises a variable speed motor. The reference torque region having a specified range is set in the comparator (53).

The comparator (53) compares the detected torque with the reference torque region, and when the detected torque does not reach the reference torque region, the comparator (53) outputs a speed decrease request signal to the controller (54), and when the detected torque exceeds the reference torque region, the comparator (53) outputs a speed increase request signal to the controller (54). When the controller (54) receives the speed decrease request signal, the controller (54) has the drive (25) decrease in speed for a specified time, and when the controller receives the speed increase request signal, the controller (54) has the drive (25) increase in speed for a specified time.

According to this arrangement, when the moisture content of a cake is increased with insufficient dehydration of sludge in the cylindrical space (70), the torque detector (52) detects decreased torque. When the detected torque does not reach the reference torque region, there is a strong possibility that the cake to be discharged from the downstream region (72) may not be sufficiently consolidated, and the speed decrease request signal is output from the comparator (53) to the controller (54). The controller (54) which receives the speed decrease request signal reduces the speed of the drive (25) for a specified time. As a result, the residence time of the raw liquid in the cylindrical space (70) is extended, and the raw liquid undergoes an adequate filtrate dehydration so that the sludge is sufficiently dehydrated. Therefore, the cake having a desired moisture content in a suitably consolidated state is discharged.

Meanwhile, when the moisture content of the cake is lowered, torque detected by the torque detector (52) rises. When the detected torque exceeds the reference torque region, there is a strong possibility that the cake to be discharged from the downstream region (72) may be consolidated excessively, and the speed increase request signal is output form the comparator (53) to the controller (54). The controller (54) which receives the speed increase request signal increases the speed of the drive (25) for a specified time. As a result, the residence time of the raw liquid in the cylindrical space (70) is shortened, and the raw liquid undergoes an adequate filtrate dehydration so that the cake having a desirable moisture content in a suitably consolidated state is discharged.

A seventh aspect of the invention provides a screw press apparatus depending from the third aspect, which further comprises a cleaning pump (55) for supplying cleaning water to the cleaning pipe (34), a drive (25) for driving the screw shaft (6), a torque detector (52) provided for the drive (25), and a control unit (89) for controlling the drive (25) and the cleaning pump (55) in accordance with detected torque detected by the torque detector (52).

According to this arrangement, when the screen (8) is clogged and the load applied to the drive (25) increases, torque detected by the torque detector (52) increases. The control unit (89) is then adapted to control the drive (25) and the cleaning pump (55) in dependence on a variation of detected torque, for restoring the screen (8).

An eighth aspect of the invention provides a screw press apparatus depending from the seventh aspect, in which the control unit (89) has a comparator (53) and a controller (54). The drive (25) comprises a reversible motor, an abnormal torque value is set in the comparator (53). The comparator (53) compares the detected torque with the abnormal torque value, and when the detected torque exceeds the abnormal torque value, the comparator (53) outputs a cleaning request signal to the controller (54), when the controller (54) is not given the cleaning request signal, the controller (54) rotates the drive (25) in the forward direction to have the screw shaft (6) rotate in the forward direction. When the controller (54) receives the cleaning request signal, the controller (54) rotates the drive (25) in the reverse direction for a specified time to have the screw shaft (6) rotate in the reverse direction, and drives the cleaning pump (55) for a specified time to have the cleaning water ejected from the cleaning pipe (34) to the screen (8).

According to this arrangement, in a normal filtering operation in which detected torque by the torque detector (25) is not in excess of the abnormal torque value, the controller (54) does not receive an input of the cleaning request signal.

Accordingly, in a state in which the screen (8) is stopped relative to the frames (3, 4), the screw blade (13) rotates relative to the screen (8), and raw liquid is carried under pressure from the upstream region (71) to the down stream region (72).

When the screen (8) is clogged and the load applied to the drive (25) increases, torque detected by the torque detector (52) increases. When the detected torque exceeds the abnormal torque value, there is a great possibility that the screen may require cleaning. For this reason, the cleaning request signal is output from the comparator (53) to the controller (54). The controller (54) which receives the cleaning request signal rotates the drive (25) in the reverse direction for specified time and drives the cleaning pump (55) for a specified time. Thereby, the screw shaft (6) rotates in the reverse direction, the piston claw (31) is engaged with the claw (28) to prevent the relative rotation of the outside tube (5) with respect to the screw shaft (6), the outside tube (5) and the screen (8) rotate integrally with the screw shaft (6), and sludge in a consolidated state in the cylindrical space (70) is fed back. At the same time, cleaning water is ejected from the cleaning pipe (34) onto the screen (8), and thus the whole peripheral region of the screen (8) is washed and can be reused.

A ninth aspect of the invention provides a screw press apparatus depending from the first aspect, which further comprises a pump (59) for supplying raw liquid to the cleaning pipe (16), a measuring instrument (56) for measuring a percentage of a solid material in the filtrate flowing out of the screen (8), and a control unit (90) for controlling the pump (59) in accordance with a measured value from the measuring instrument (56).

According to this arrangement, if a cake is stagnant at the downstream region (72) of the cylindrical space (70), increasing the proportion of solid materials in filtrate, the measuring instrument (56) measures an increased value. The control unit (90) is then adapted to control the pump (59) in dependence on a variation of measured value to reduce the supply for supply of raw liquid to the cylindrical space (70). Thereby, the cake stagnation is solved, decreasing the proportion of solid materials in filtrate.

A tenth aspect of the invention provides a screw press apparatus depending from the ninth aspect, in which the control unit (90) has a comparator (57) and a controller (58). A reference value is set in the comparator (57). The comparator (57) compares the measured value with the reference value, and when the measured value exceeds the reference value, the comparator (57) outputs a pressure decrease request signal to the controller (58). When the controller (58) receives the pressure decrease request signal, the controller (58) reduces a force-in pressure of the pump (59).

According to this arrangement, if a cake is stagnant at the downstream region (72) of the cylindrical space (70), increasing the proportion of solid materials in filtrate, the measuring instrument (56) measures an increased value. If the measured value is in excess of the reference value, the amount of stagnant cake may well be excessive, and a pressure decrease request signal is output from the comparator (57) to the controller (58). Given the pressure decrease request signal, the controller (58) makes the pump (59) have a decreased force-in pressure, decreasing the pressure for supply of raw liquid to the cylindrical space (70). Thereby, the cake stagnation is solved, decreasing the proportion of solid materials in filtrate.

An eleventh aspect of the invention provides a screw press apparatus depending from the first aspect, which further comprises a pump (59) for supplying raw liquid, a supply path (60) for interconnecting the supply pipe (16) and the pump (59), a pressure detector (61) provided in the supply path (60), for detecting an inlet pressure of raw liquid to the cylindrical space (70), and a control unit (91) for controlling the pump (59) in accordance with the inlet pressure detected by the pressure detector (61).

According to this arrangement, with a varying state of raw liquid (sludge and cake) in the cylindrical space (70), the pressure of inflowing raw liquid to the cylindrical space (70) changes, which is detected by the pressure detector (61). The control unit (90) is responsive to a change of the inflow pressure to control the pump (59), decreasing the supply pressure of raw liquid to the cylindrical space (70). Thereby, raw liquid in the cylindrical space (70) enters a stable state, rendering the filtration process stable.

A twelfth aspect of the invention provides a screw press apparatus depending from the eleventh aspect, in which the control unit (91) has a comparator (62) and a controller (63). A reference pressure region having a specified range is set in the comparator (62). The comparator (62) compares the inlet pressure with the reference pressure region, and when the inlet pressure exceeds the reference pressure region, the comparator (62) outputs a pressure decrease request signal to the controller (63), and when the inlet pressure does not reach the reference pressure region, the comparator (62) outputs a pressure increase request signal to the controller (63). When the controller (63) receives the pressure decrease request signal, the controller (63) decreases a force-in pressure of the pump (59) a for specified time, and when the controller (63) receives the pressure increase request signal, the controller (63) increases the force-in pressure of the pump (59) for a specified time.

According to this arrangement, in the case where the sludge in the cylindrical space (70) is not sufficiently dehydrated and it insufficiently becomes a cake, the inlet pressure of the raw liquid into the cylindrical space (70) detected by the pressure detector (61) is lowered. When the inlet pressure does not reach the reference pressure region, there is a strong possibility that a cake in a desirably consolidated state is not discharged. For this reason, the pressure increase request signal is output from the comparator (62) to the controller (63). The controller (63) which receives the pressure increase request signal increases the force-in pressure of the pump (59) for a specified time. As a result, the supplying amount of the raw liquid into the cylindrical space (70) increases, and the pressure in the cylindrical space (70) rises, and the sludge is sufficiently dehydrated to be concentrated so that the cake in the desirably consolidated state is discharged.

Meanwhile, in the case where the sludge in the cylindrical space (70) is abruptly dehydrated and the cylindrical space (70) is filled with the cake, the inlet pressure of the raw liquid into the cylindrical space (70) detected by the pressure detector (61) rises. When the inlet pressure exceeds the reference pressure region, there is strong possibility that the raw liquid is excessively fed because the cylindrical space (70) is filled with the cake. For this reason, the pressure decrease request signal is output from the comparator (62) to the controller (63). The controller (63) which receives the pressure decrease request signal reduces the force-in pressure of the pump (59) for specified time. As a result, the supplying amount of the raw liquid into the cylindrical space (70) is reduced, and thus deterioration in the throughput capacity due to the excessive supplying of the raw liquid is prevented previously.

A thirteenth aspect of the invention provides a screw press apparatus depending from the first aspect, which further comprises a cake discharge hole (96) for a cake to be pushed therethrough out of the cylindrical space (70), an air cylinder (23) fixed to the second frame (4), an air cylinder (23) connected to a shaft (23a) of the air cylinder (23) and adapted for forward and backward movements to change the open degree of the cake discharge hole (96), a detector (100) provided for the air cylinder (23), for detecting the open degree, an air supply path (101) connected to the air cylinder (23), a regulator valve (102) provided in the air supply path (101), a pilot valve (103) for changing a set air pressure of the regulator valve (102), and a control unit (104) for operating the pilot valve (103) in accordance with a detected value from the detector (100).

According to this arrangement, a cake is discharged through the cake discharge hole (96), from the downstream region (72) of the cylindrical space (70). The open degree of the cake discharge hole (96) is changed by the presser (21).

With a varying condition of cake, the pressing force from the cake to the presser (21) changes, and the open degree of the cake discharge hole (96) is changed, and the detection value from the detector (100) is varied. The control unit (104) is then adapted for operating the pilot valve (103) in dependence on a change amount of the open degree (as a variation of the detected value), to have a switched set air pressure of the regulator valve (102), increasing or decreasing the pressure in the air cylinder (23). Thereby, the presser (21) moves, the open degree of the cake discharge hole (96) is changed, the variation in thickness of the cake to be discharged is suppressed, and a cake of a desirable thickness is discharged in a stable manner.

A fourteenth aspect of the invention provides a screw press apparatus depending from the thirteenth aspect, in which the control unit (104) has a comparator (105) and a controller (106). A standard open degree is set in the comparator (105). The comparator (105) compares the detected value with the standard open degree, and when the detected value exceeds the standard open degree, the comparator (105) outputs a pressure increase request signal to the controller (106), and when the detected value does not reach the standard open degree, the comparator (105) outputs a pressure decrease request signal to the controller (106). When the controller (106) receives the pressure increase request signal, the controller (106) increases the set air pressure of the regulator valve (102), and when the controller receives the pressure decrease signal, the controller (106) decreases the set air pressure of the regulator valve (102).

According to this arrangement, when the cake is hardened, a pressing force from the cake to the presser (21) increases, the degree of opening of the cake discharge hole (96) increases, and the detected value from the detector (100) increases. When the detected value exceeds the standard open degree, there is a strong possibility that the thickness of the cake to be discharged may be remarkably increased, and the pressure increase request signal is output from the comparator (105) to the controller (106). The controller (106) which receives the pressure increase request signal operates the pilot valve (103) to increase the set air pressure of the regulator valve (102). As a result, the presser (21) moves, and the increase in degree of opening of the cake discharge hole (96) is suppressed, and the cake having a uniform thickness is discharged.

Meanwhile, when the cake is softened, a pressing force from the cake to the presser (21) is decreased, and the degree of opening of the cake discharge hole (96) is decreased so that the detected value from the detector (100) decreases. When the detected value does not reach the standard open degree, there is a strong possibility that the thickness of the cake to be discharged may be decreased remarkably, and the pressure decrease request signal is output from the comparator (105) to the controller (106). The controller (106) which receives the pressure increase request signal operates the pilot valve (103) to reduce the set air pressure of the regulator valve (102). As a result, the presser (21) moves so that the reduction in degree of opening of the cake discharge hole (96) is suppressed and the cake having a uniform thickness is discharged.

A fifteenth aspect of the invention provides a screw press apparatus depending from the first aspect, which further comprises a cake discharge hole (96) for a cake to be pushed therethrough out of the cylindrical space (70), an air cylinder (23) fixed to the second frame (4), a presser (21) connected to a shaft (23a) of the air cylinder (23) and adapted for forward and backward movements to change the open degree of the cake discharge hole (96), a detector (100) provided for the air cylinder (23), for detecting the open degree, and a control unit (104) for controlling the drive (25) in accordance with the detected value from the detector (100).

According to this arrangement, a cake is discharged through the cake discharge hole (96), from the downstream region (72) of the cylindrical space (70).

If the moisture content of cake is varied, the pressing force from the cake to the pressure (21) varies, causing the open degree of the cake discharge hole (96) to change, and the detection value from the detector (100) is changed. The control unit (104) is then adapted to control the drive (25) in dependence on a change of the open degree (as a change of the detection value), for increasing or decreasing the transfer speed of raw liquid in the cylindrical space (70) to supress the variation in moisture content of the cake. The moisture content of the cake to be discharged is thereby rendered stable.

A sixteenth aspect of the invention provides a screw press apparatus depending from the fifteenth aspect, in which the control unit (104) has a comparator (105) and a controller (106). The drive (25) comprises a variable speed motor. A reference open degree is set in the comparator (53). The comparator (53) compares the detected value with the reference open degree, and when the detected value exceeds the reference open degree, the comparator (53) outputs a speed increase request signal to the controller (106), and when the detected value does not reach the reference open degree, the comparator (53) outputs a speed decrease request signal to the controller (106). When the controller (106) receives the speed increase request signal, the controller (106) has the drive (25) increase in speed, and when the controller (106) receives the speed decrease request signal, the controller (106) has the drive (25) decrease in speed.

According to this arrangement, when the cake is hardened and the moisture content is lowered, a pressing force from the cake to the presser (21) increases, the degree of opening of the cake discharge hole (96) increases, and the detected value from the detector (100) increases. When the detected value exceeds the standard open degree, there is a strong possibility that the thickness of the cake may be remarkably increased, and the speed increase request signal is output from the comparator (105) to the controller (106). The controller (106) which receives the speed increase request signal has the drive (25) increase in speed, for increasing the transfer speed of raw liquid in the cylindrical space (70) to raise the moisture content of cake. The moisture content of the cake to be discharged is thereby stabilized to a constant state.

Meanwhile, when the cake is softened and the moisture content rises, a pressing force from the cake to the presser (21) is decreased, and the degree of opening of the cake discharge hole (96) is decreased so that the detected value from the detector (100) decreases. When the detected value does not reach the standard open degree, there is a strong possibility that the thickness of the cake may be increased remarkably, and the speed decrease request signal is output from the comparator (105) to the controller (106). The controller (106) which receives the pressure increase request signal has the drive (25) decrease in speed, for delaying the transfer speed of raw liquid in the cylindrical space (70) to reduce the moisture content of cake. The moisture content of the cake to be discharged is thereby stabilized to a constant state.

BEST MODE FOR CARRYING OUT THE INVENTION

There will be detailed below embodiments of the present invention with reference to the drawings.

Figure 1:
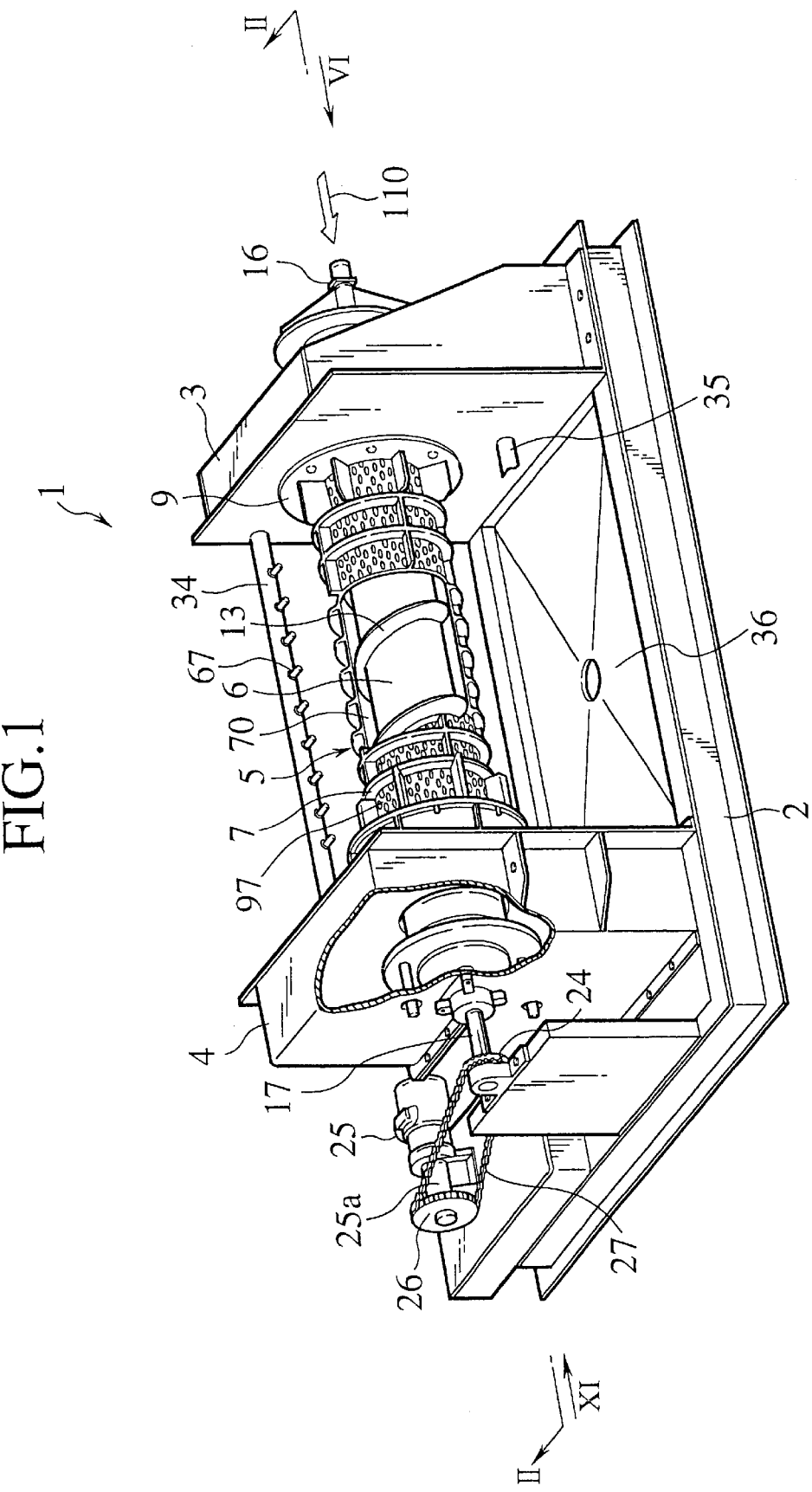
FIG. 1 is a perspective view of an entirety of a screw press apparatus according to an embodiment of the present invention.
Figure 2:
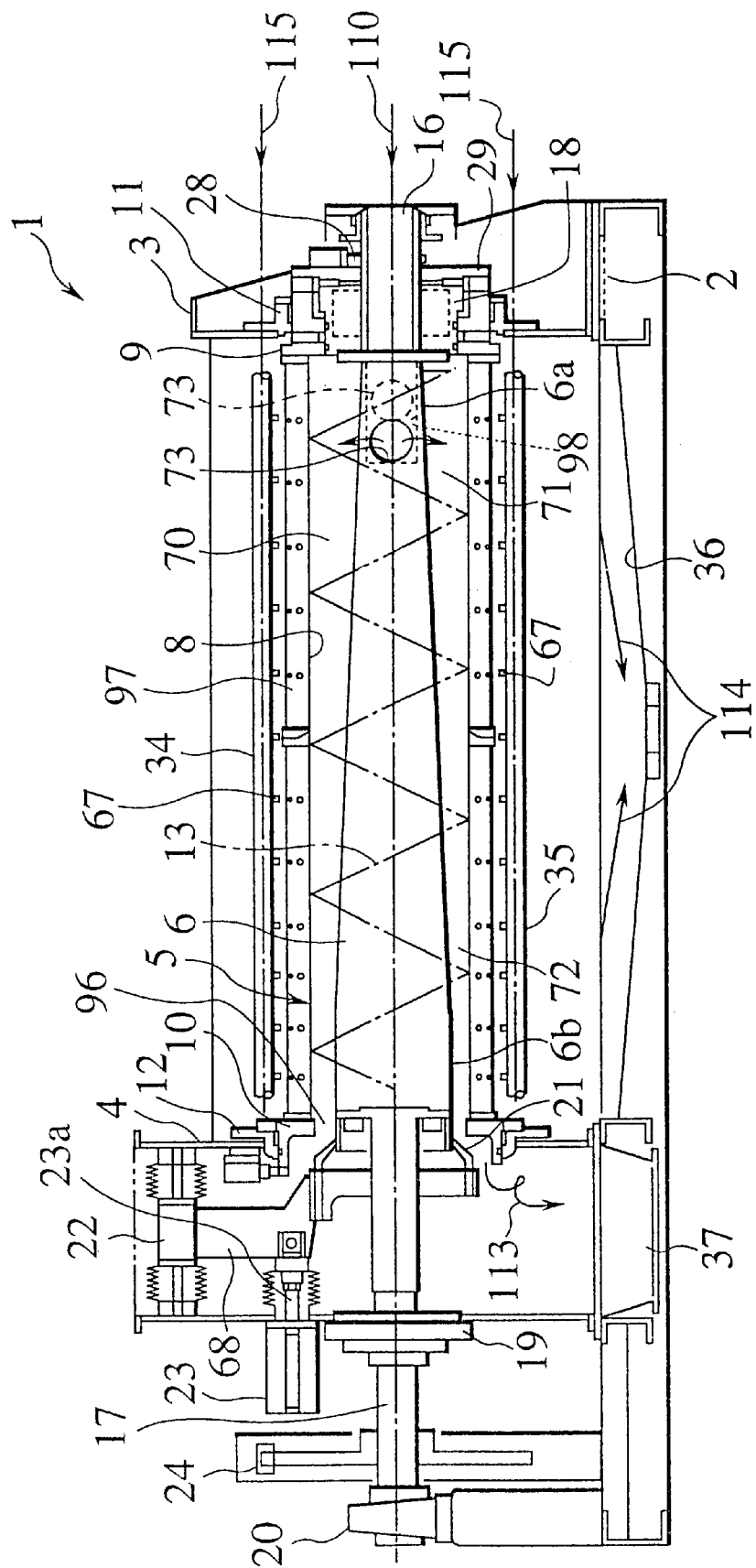
FIG. 2 is a sectional view taken along line II—II of FIG. 1.

As shown in FIGS. 1 and 2, a screw press apparatus 1 according to the present embodiment has first and second frames 3 and 4, an outside tube 5, a screw shaft 6, a screen 8, a screw blade 13, a supply pipe 16 and a cleaning pipe 34. The first and second frames 3 and 4 are fixed to a base 2 so as to face each other.

The outside tube 5 is comprised of a flange 9 and a rotary plate 10 at both ends, a cylindrical punched plate 97 for interconnecting the flange 9 and the rotary plate 10 with each other, a screen 8 fixed to an inner peripheral surface of the punched plate 97 and a plurality of ribs 7. The screen 8 is reinforced with the punched plate 97 and the ribs 7.

Bearings 11 and 12 are fixed to the frames 3 and 4, respectively. The flange 9 is supported rotatably to the first frame 3 via the bearing 11, and the rotary plate 10 is supported rotatably to the second frame via the bearing 12.

The screw shaft 6 is inserted through the screen 8, and the screw shaft 6 and the screen 8 are disposed coaxially. The supply pipe 16 which is coaxial with the screw shaft 6 is fixed to one end 6a of the screw shaft 6. The supply pipe 16 is supported rotatably to the first frame 3 via the bearings 18 and 11. A drive shaft 17 which is coaxial with the screw shaft 6 extends from the other end 6b of the screw shaft 6. The drive shaft 17 is supported rotatably to the second frame 4 via a bearing 19 fixed to the second frame 4 and a bearing 20 fixed to the base 2.

Figure 13:
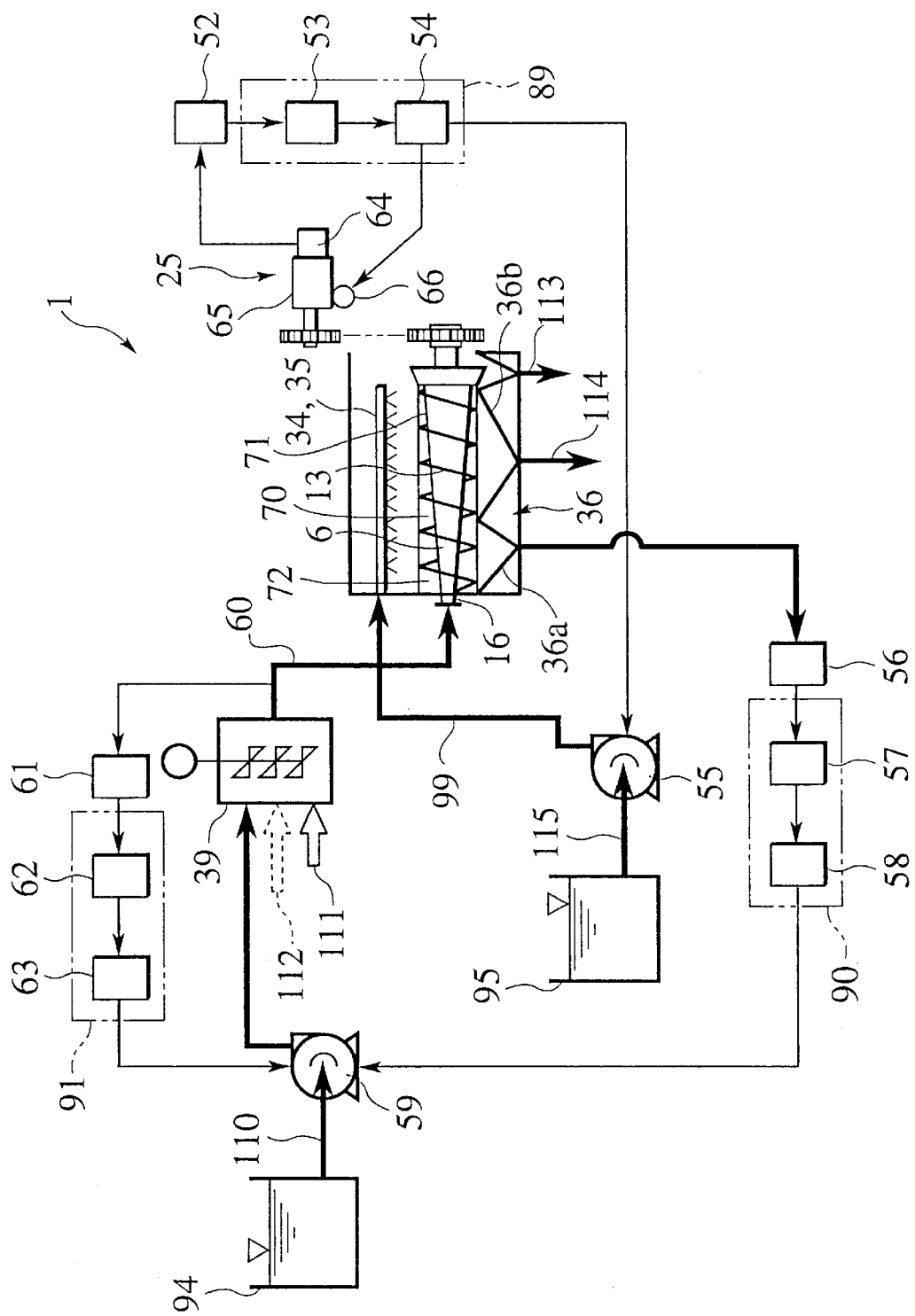
FIG. 13 is a schematic diagram illustrating control flow.

A drive 25 for driving the screw shaft 6 is mounted on the base 2. A sprocket 26 which is fixed to a shaft 25a of the drive 25 and a sprocket 24 which is fixed to the drive shaft 17 are connected to each other by a chain 27, and the drive 25 drives and rotates the screw shaft 6 via the chain 27. As shown in FIG. 13, the drive 25 is comprised of a reversible-type variable speed motor which has a motor 64, a speed reduction gear 65 and a pilot motor 66 so that its rotation can be switched between rotation in a forward direction and rotation in a reverse direction and the rotating speed is changeable.

As shown in FIG. 2, an outer peripheral surface of the screw shaft 6 and the inner peripheral surface of the screen 8 define a cylindrical space 70. The cylindrical space 70 is continued from an upstream region 71 on the side of the first frame 3 to a downstream region 72 on the side of the second frame 4. The outer peripheral surface of the screw shaft 6 has a tapered form which spreads from one end 6a towards the other end 6b. As a result, the relative distance between the outer peripheral surface of the screw shaft 6 and the inner peripheral surface of the screen 8 decreases from the upstream region 71 towards the downstream region 72.

Figure 3:
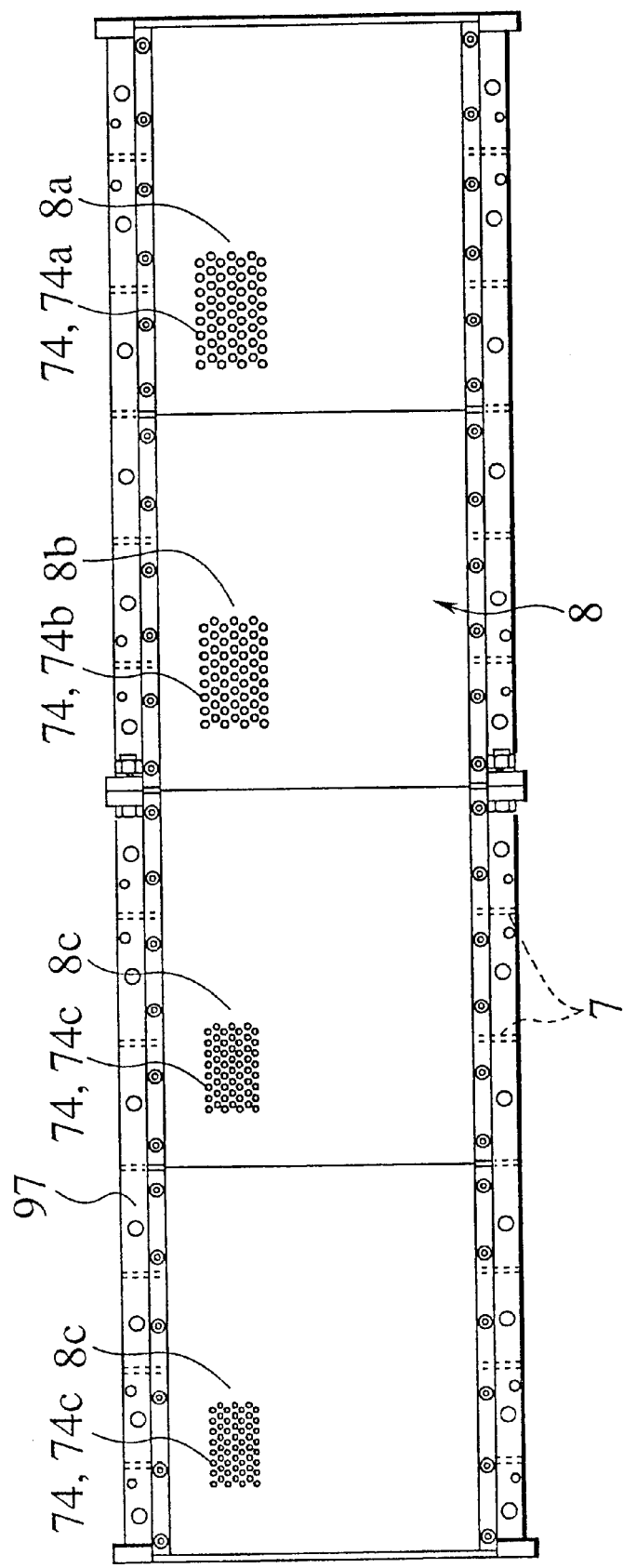
FIG. 3 is an outside view of a screen of FIG. 2.

As shown in FIG. 3, the screen 8 is comprised of four screen elements 8a, 8b, 8c and 8c which are arranged on a substantially single curved surface. The screen element 8a is disposed on the side of the upstream region 71 (see FIG. 2), the two screen elements 8c are disposed on the side of the downstream region 72 (see FIG. 2), and the screen element 8b is disposed between the screen elements 8a and 8c. A lot of substantially circular fine holes 74 (74a, 74b, 74c) are formed in the screen elements 8a, 8b and 8c. The fine holes 74a have an outer diameter larger than that of the fine holes 74b, and the fine holes 74b have an outer diameter larger than that of the fine holes 74c. For example, the diameters of the fine holes 74a, 74b and 74c are set respectively to 1.5 mm, 1.0 mm and 0.5 mm. Namely, a size of the fine holes 74 decreases gradually from the upstream region 71 towards the downstream region 72. A lot of holes remarkably larger than the fine holes 74 are formed in the punched plate 97 so that a filtering function of the screen 8 is not influenced.

Figure 4:
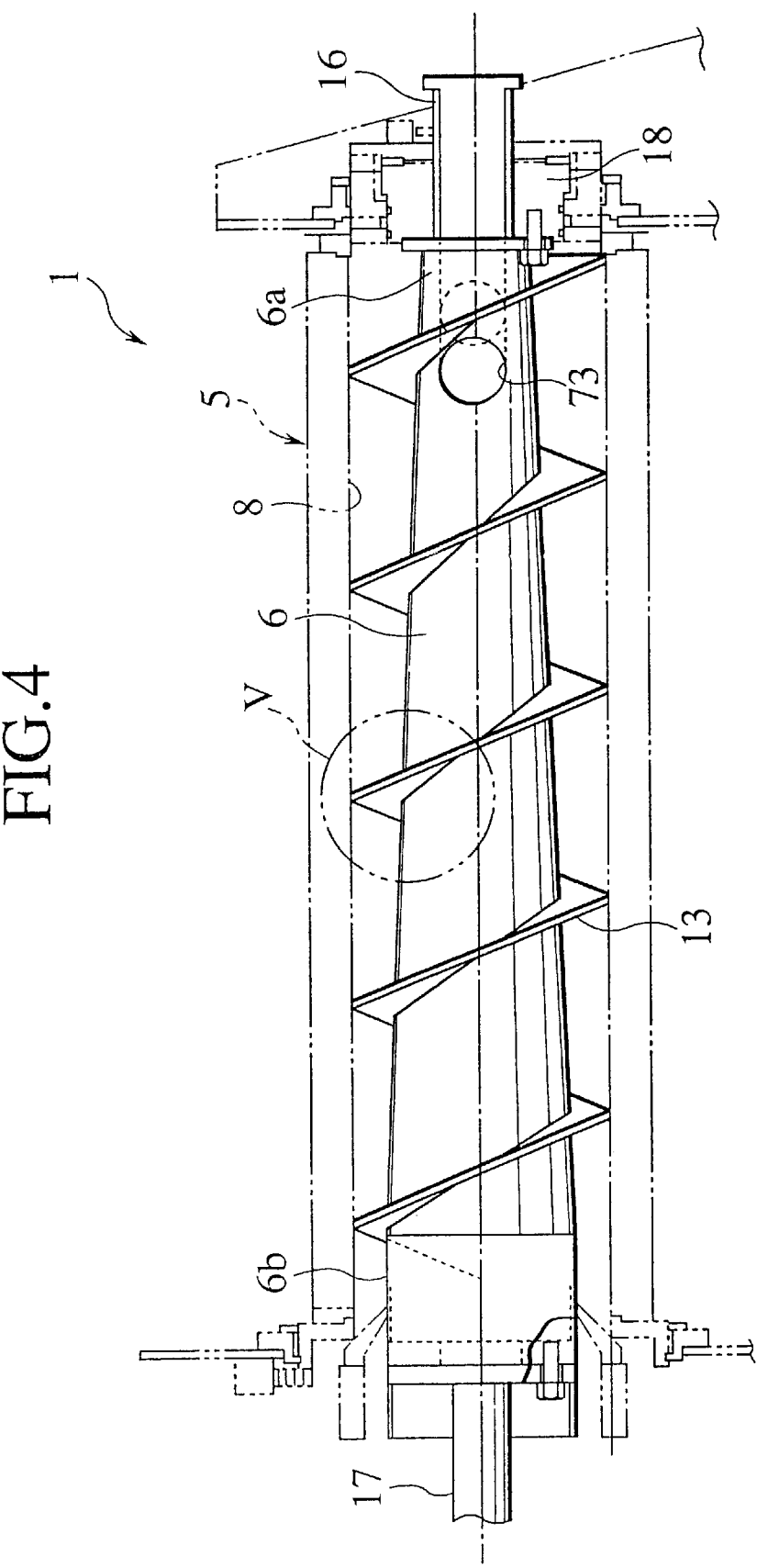
FIG. 4 is an outside view of a screw shaft of FIG. 2.

As shown in FIG. 4, the screw blade 13 is projected from the screw shaft 6 into the cylindrical space 70 and is continued from the upstream region 71 to the downstream region 72.

Figure 5:
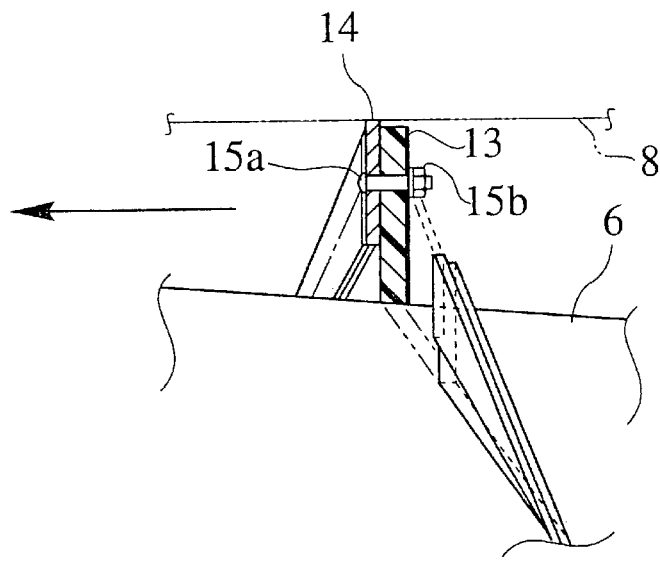
FIG. 5 is an enlarged partial sectional view of part V of FIG. 4.

As shown in FIG. 5, a scraper 14, which is made of a material having elasticity such as rubber or synthetic resin, is fixed to the screw blade 13 by a bolt 15a and a nut 15b. The scraper 14 continuously extends from the upstream region 71 to the downstream region 72 (the whole region of the screw blade 13), and contacts elastically with the screen 8. The contact pressure of the scraper 14 with the screen 8 is adjusted by clearances between the bolt 15a and a hole of the screw blade 13 and/or a hole of the scraper 14 through which the bolt 15a is inserted.

As shown in FIG. 2, an internal flow path 98 which is interconnected to the supply pipe 16 and a pair of openings 73, 73 which open the internal flow path 98 into the upstream region 71 are formed at one end 6a of the screw shaft 6. The two openings 73, 73 face opposite to each other, and the respective openings 73 are disposed so as to avoid an interference with the screw blade 13.

Upper and lower cleaning pipes 34 and 35 are disposed outside the outside tube 5 between the first and second frames 3 and 4. The cleaning pipes 34 and 35 have a plurality of nozzles 67 which face towards the punched plate 97.

As shown in FIG. 13, raw liquid tank 94 and the supply pipe 16 are connected by a supply path 60. A pump 59 and a coagulant mixing tank 39 are provided in the supply path 60. The pump 59 supplies raw liquid 110 in the raw liquid tank 94 to the supply pipe 16 via the supply path 60 and the coagulant mixing tank 39.

As shown in FIG. 2, the raw liquid 110 fed to the supply pipe 16 passes through the internal flow path 98 and is fed from the opening 73 to the upstream region 71. The raw liquid 110 in the upstream region 71 is pressurized and carried towards the downstream region 72 by the screw blade 13 which rotates in a forward direction, and simultaneously the raw liquid 110 is separated into a filtrate 114, which flows out from the fine holes 74 of the screen 8, and a cake 113, which moves in the cylindrical space 70 and is discharged from the downstream region 72. A filtrate trough 36 which receives the filtrate 114 and a cake chute 37 which receives the cake 113 are fixed to the base 2. As shown in FIG. 13, the filtrate trough 36 is comprised of a detection oriented trough 36a which receives only filtrate discharged from the downstream region 72, and a discharge oriented trough 36b which receives only filtrate from the other regions. Here, in FIGS. 1 and 2, the detection oriented trough 36a is omitted.

Figure 14:
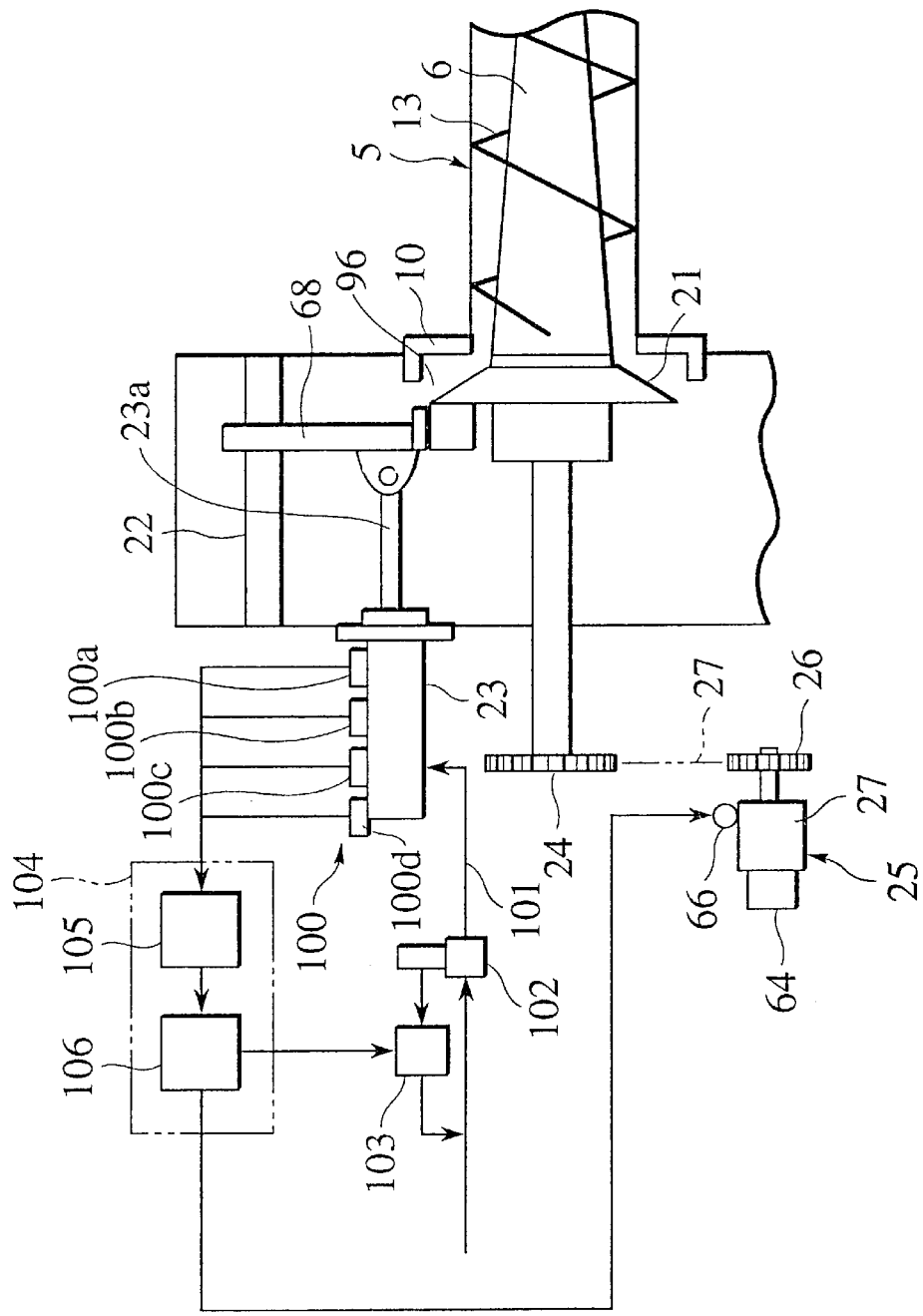
FIG. 14 is a schematic diagram illustrating control flow.

As shown in FIGS. 2 and 14, a circular cake discharge hole 96 from which the cake is pushed out is formed between the outside tube 5 and the rotary plate 10. A presser 21 which is movable along the drive shaft 17 is disposed in the cake discharge hole 96. An air cylinder 23 if fixed to the second frame 4. The presser 21 is connected to a shaft 23a of the air cylinder 23 via a connecting member 68. The presser 21 moves forward and backward in accordance with forward and backward movements of the shaft 23a, and changes the degree of opening of the cake discharge hole 96. As a result, a back pressure to a cake in the cylindrical space 70 is adjusted. Here, the presser 21 may be constituted so as to rotate together with the drive shaft 17 and to allow the rotation of the drive shaft 17.

Figure 6:
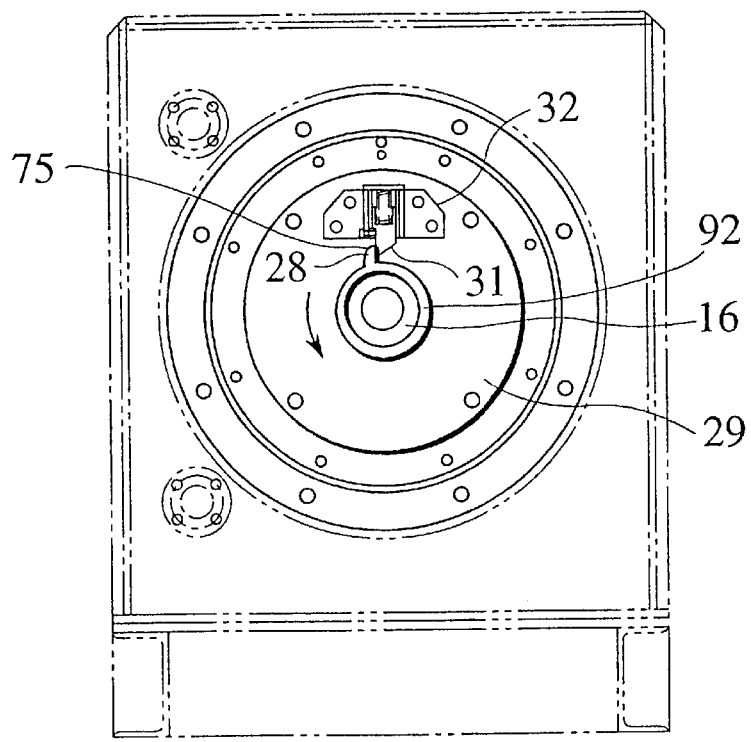
FIG. 6 is a side view of an outside tube, the screw shaft, a stopper and a stopper pin in direction VI of FIG. 2.
Figure 7:
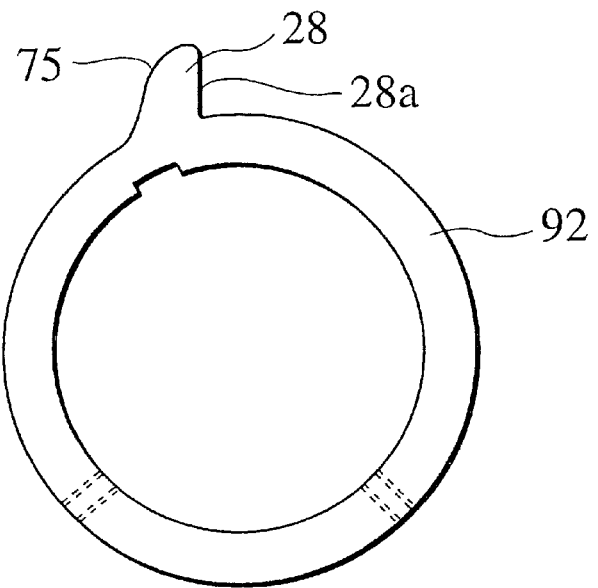
FIG. 7 is a side view of a claw of FIG. 6.
Figure 8:
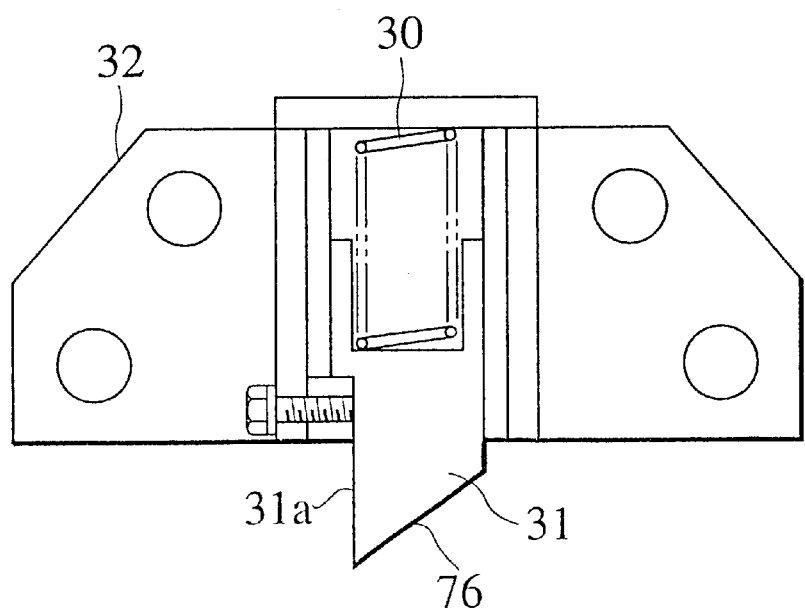
FIG. 8 is a side view of a piston claw of FIG. 6.

As shown in FIGS. 6, 7 and 8, a ring 92 having a claw 28 projected outward is fixed to an outer peripheral surface of the supply pipe 16. The claw 28 has a slanted surface (as a first guide surface) 75 ahead of the forward rotating direction (to the left side in FIGS. 6 and 7) of the supply pipe 16 (screw shaft 6), and a claw surface 28a along a normal line of the supply pipe 16 ahead of the reverse rotating direction of the supply pipe 16 (an opposite side to the slanted surface 75).

A rotary plate 29 which is disposed around the supply pipe 16 is fixed to an outer surface of the flange 9 of the outside tube 5. A housing 32 is fixed to the rotary plate 29, and a piston claw (as a first movable claw) 31 and a compression spring (as a first spring) 30 are housed in the housing 32. The piston claw 31 is supported to be free to project outside and sink inside the supply pipe. The compressing spring 30 biases the piston claw 31 towards a range where the claw 28 moves according to the rotation of the screw shaft 6 (supply pipe 16). The piston claw 31 has a slanted surface (as a first guide surface) 76 ahead of the reverse rotating direction of the supply pipe 16 (to the right side of FIGS. 6 and 8), and a claw surface 31a along the normal line of the supply pipe 16 ahead of the forward rotating direction of the supply pipe 16 (an opposite side to the slanted surface 76).

Figure 9:
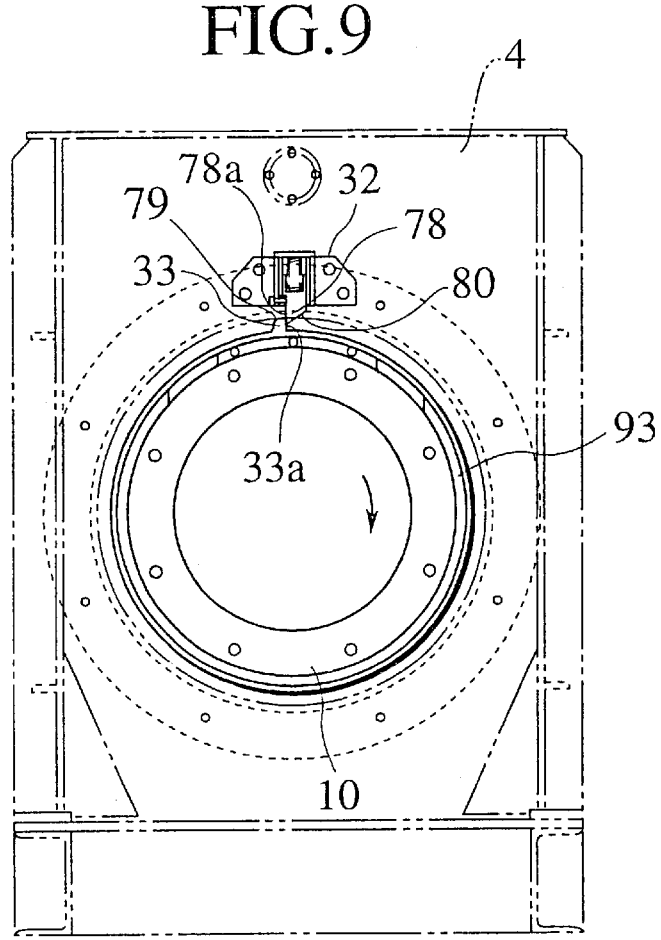
FIG. 9 is a side view of the outside tube, the screw shaft, the stopper and the stopper pin in a direction IX of FIG. 2.
Figure 10:
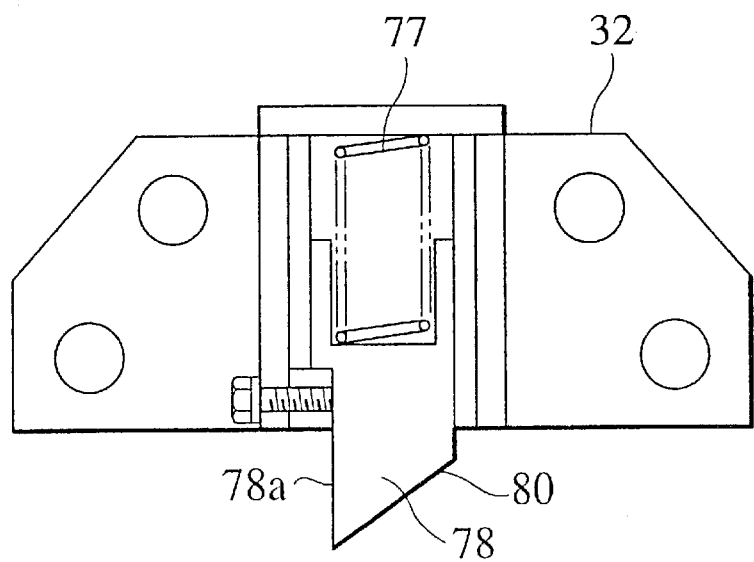
FIG. 10 is a side view of the piston claw of FIG. 9.

As shown in FIGS. 9 and 10, a ring 93 having a stopper 33 projected outwardly is fixed to an outer peripheral surface of the rotary plate 10. The stopper 33 has a slanted surface (second guide surface) 79 ahead of a reverse rotating direction (to the left side in FIG. 9) of the rotary plate 10 (screw shaft 6), and a stopper surface 33a along a normal line of the rotary plate 10 ahead of a forward rotating direction (an opposite side to the slanted surface 79) of the rotary plate 10.

The housing 32 is fixed to an outer surface of the second frame 4, and a piston claw (as a second movable claw) 78 and a compression spring (as a second spring) 77 are housed in the housing 32. The piston claw 78 is supported to be free to project outside and sink inside the rotary plate 10. The compression spring 78 biases the piston claw 78 towards a range where the stopper 33 moves according to the rotation of the outside tube 5 (rotary plate 10). The piston claw 78 has a slanted surface (as a second guide surface) 80 ahead of the forward rotating direction (to the right side in FIGS. 9 and 10) of the rotary plate 10, and a claw surface 78a along the normal line of the rotary plate 10 ahead of the reverse rotating direction (an opposite side to the slanted surface 80) of the rotary plate 10.

When the screw shaft 6 rotates in the forward direction, the slanted surface 75 of the claw 28 slides on the slanted surface 76 of the piston claw 31, and the claw 28 pushes the piston claw 31 up against the biasing force of the compression spring 30. As a result, the piston claw 31 moves out of the moving range of the claw 28, and a relative rotation of the outside tube 5 with respect to the screw shaft 6 is allowed. Meanwhile, the stopper surface 33a of the stopper 33 contacts with the claw surface 78a of the piston claw 78, and the piston claw 78 is engaged with the stopper 33 by a biasing force of the compression spring 77. As a result, the relative rotation of the outside tube 5 with respect to the frames 3 and 4 is prevented. Therefore, the screen 8 is held in a stopped state relative to the frames 3 and 4, and the raw liquid is compressed and carried from the upstream region 71 to the downstream region 72.

When the screw shaft 6 rotates in the reverse direction, the claw surface 28a of the claw 28 contacts with the claw surface 31a of the piston claw 31, and the piston claw 31 is engaged with the claw 28 by a biasing force of the compression spring 30. As a result, the relative rotation of the outside tube 5 with respect to the screw shaft 6 is prevented. Meanwhile, the slanted surface 79 of the stopper 33 slides on the slanted surface 80 of the piston claw 78, and the stopper 33 pushes the piston claw 78 up against the biasing force of the compression spring 77. As a result, the piston claw 78 moves out of the moving range of the stopper 33, and a relative rotation of the outside tube 5 with respect to the frames 3 and 4 is allowed. Therefore, the outside tube 5 and the screen 8 rotates integrally with the screw shaft 6.

Figure 11:
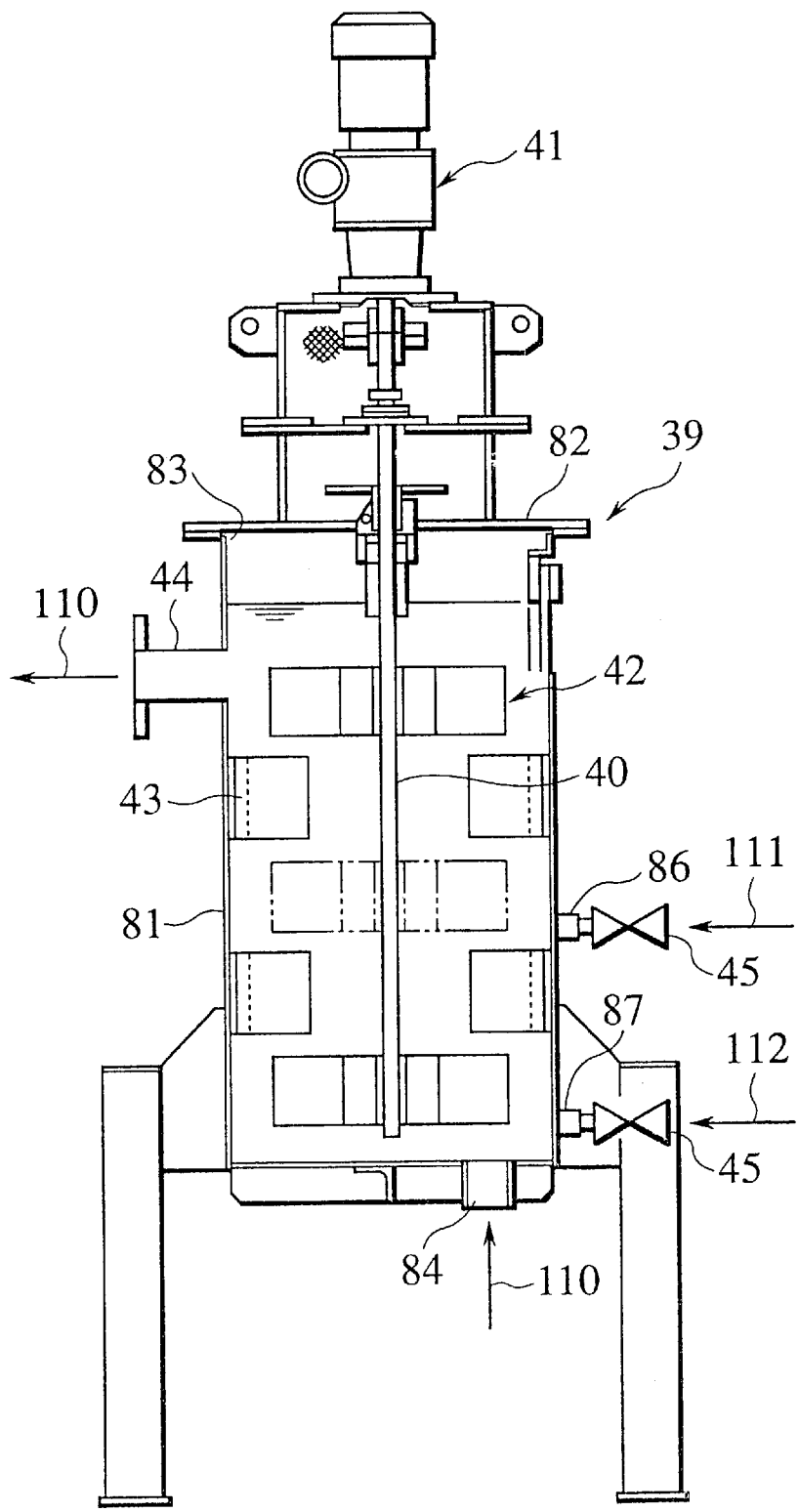
FIG. 11 is a sectional view of a coagulant mixing tank.
Figure 12:
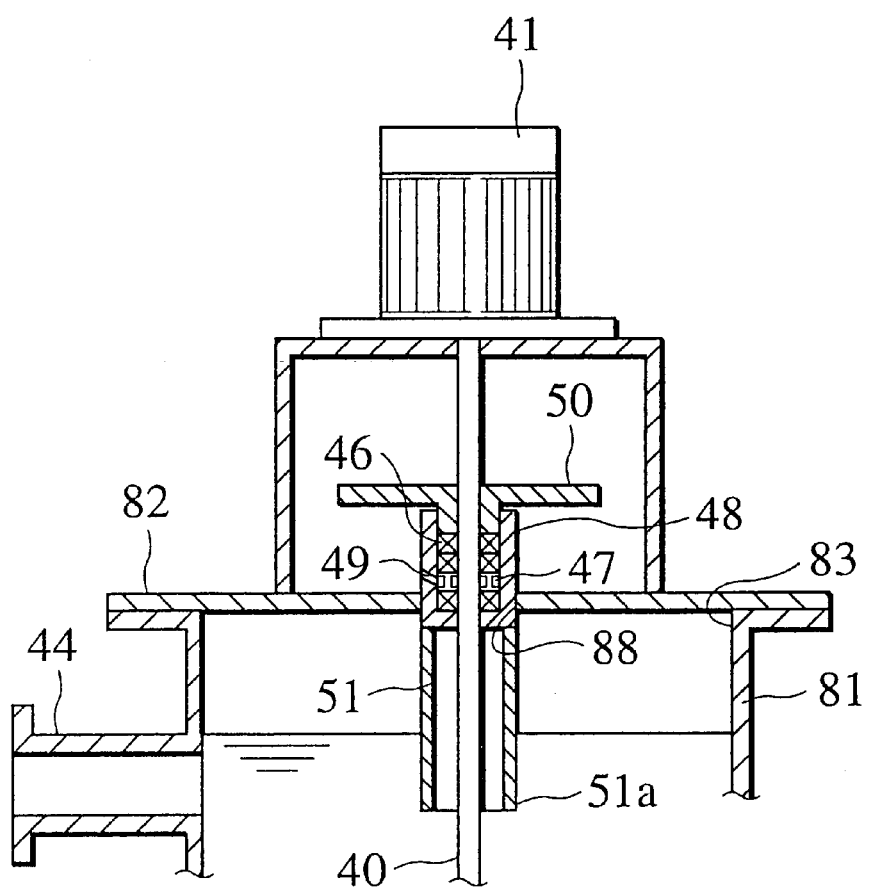
FIG. 12 is an enlarged view of an essential portion of FIG. 11.

As shown in FIGS. 11 and 12, the coagulant mixing tank 39 has a tank body 81, an upper cover 82, a gland box 48, a gland packing 46, a lantern ring 47, a seal pipe 51 and an agitation shaft 40.

The tank body 81 has an upper end opening 83, a raw liquid inlet 84, a raw liquid outlet 44 and two cohesive agent supply openings 86 and 87. The raw liquid inlet 84 is formed in a bottom of the tank body 81, and the raw liquid outlet 44 is formed in a side wall of the tank body 81. The cohesive agent supply openings 86 and 87 are formed in the side wall of the tank body 81 below the raw liquid outlet 44. The raw liquid inlet 84 is connected to the pump 59 via the supply path 60 (see FIG. 13). The raw liquid outlet 44 is connected to the supply pipe 16 via the supply path 60 (see FIG. 13).

A polymer cohesive agent 111 is fed from one cohesive agent supply opening 86 to the tank body 81, and an inorganic cohesive agent 112 is fed from the other cohesive agent supply opening 87 to the tank body 81. The cohesive agent supply openings 86 and 87 are provided respectively with valves 45. At least one of the polymer cohesive agent 111 and the inorganic cohesive agent 112 is fed by opening and closing the valves 45.

The opening 83 is covered with the upper cover 82. A through hole 88 into which the gland box 48 is fitted and fixed is formed in the upper cover 82. The gland packing 46 and the lantern ring 47 are fitted into the gland box 48. The gland packing 46 in the gland box 47 is fixed by a hold member 50. The agitation shaft 40 is inserted through the gland packing 46 and the lantern ring 47. The gland packing 46 seals between the agitation shaft 40 and the gland box 48. A discharge hole 49 is formed in a side wall of the gland box 48, close to the lantern ring 47. Leaked liquid is discharged from the lantern ring 47 via the discharge hole 49. The sealed pipe 51 extends from a lower surface of the gland box 48 to cover the agitation shaft 40. A lower end 51a of the sealed pipe 51 is dipped in the raw liquid in the tank body 81. For this reason, the inside of the tank body 81 is held in a sealed state.

A drive 41 is mounted onto the upper cover 83, and an upper portion of the agitation shaft 40 is connected to the drive 41. The agitation shaft 40 has a plurality of agitating blades 42. The agitating blades 42 are disposed in the tank body 81 below the raw liquid outlet 44 intermittently. A turning blade 43 which is projected from an inner surface of the tank body 81 is disposed in a vicinity of the agitating blade 42.

In the tank body 81, the cohesive agent fed from at least one of the cohesive agent supply openings 86 and 87 is mixed with the raw liquid fed from the raw liquid inlet 84, and the mixed solution is agitated and mixed by the agitating blades 42. As a result, flocs are formed in the raw liquid, and the raw liquid containing the flocs flows out of the raw liquid outlet 44.

As shown in FIG. 13, a cleaning water tank 95 and the cleaning pipes 34 and 35 are connected to each other by a supply path 99. A cleaning pump 55 for supplying cleaning water 115 to the cleaning pipes 34 and 35 is provided in the supply path 99.

As shown in FIG. 2, the cleaning water 115 fed to the cleaning pipes 34 and 35 is ejected from the nozzle 67 to the punched plate 97 (screen 8).

As shown in FIG. 13, a torque detector 52 for detecting drive torque is provided for the drive 25. A turbidity measuring instrument 56, for measuring a percentage of solid materials in the filtrate flowing out of the downstream region 72 of the screen 8, is provided downstream the detection oriented trough 36*a* of the filtrate trough 36. A pressure detector 61 for detecting an inlet pressure of the raw liquid into the cylindrical space 70 is provided in the supply path 60 between the raw liquid mixing tank 39 and the supply pipe 16. If it is apprehended that the filtrate to be discharged may be suspended due to a property of the raw liquid, a density measuring instrument may be used instead of the turbidity measuring instrument 56.

As shown in FIG. 14, a detector 100 for detecting the degree of opening of the cake discharge hole 96 is provided for the air cylinder 23. The detector 100 is comprised of a first through a fourth detector 100*a* through 100*d*, and detecting signals are output from the detectors 100*a* through 100*d* in accordance with a position of the shaft 23*a*. In the state in which the cake discharge hole 96 is covered, a signal is output from the first detector 101*a*, and in the state in which the cake discharge hole 97 is opened to the maximum, a signal is output from the fourth detector 101*d*.

The air cylinder 23 is connected to an air supply path 101. A regulator valve 102 and a pilot valve 103 for switching a set air pressure of the regulator valve 102 are provided in the air supply path 101.

Figure 15:
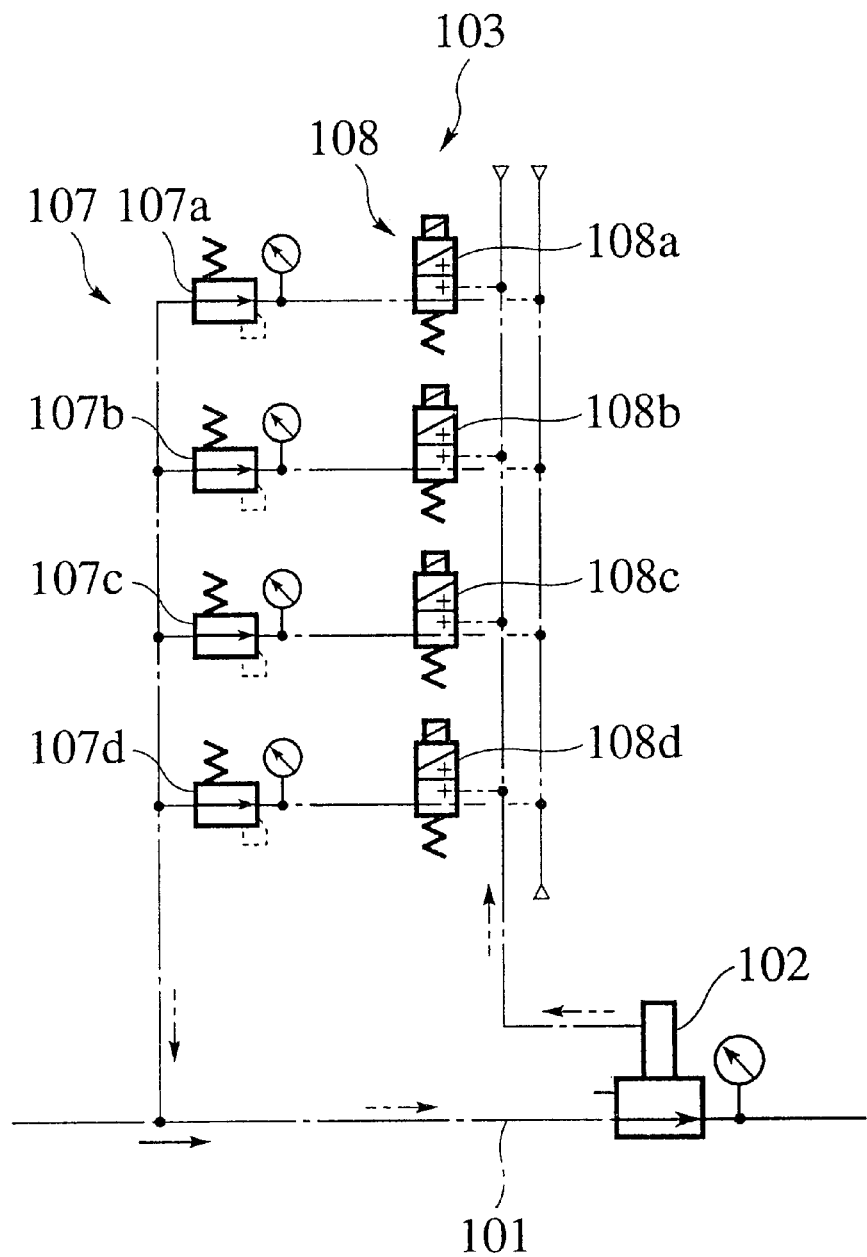
FIG. 15 is a schematic diagram illustrating a pilot valve.

As shown in FIG. 15, the pilot valve 103 is comprised of four sets of manifold reducing valves (107*a* through 107*d*) and manifold solenoid valves 108 (108*a* through 108*d*). A first reducing valve 107*a* is set to 3.5 kg/cm$^2$ (3.43×10$^5$ Pa), a second reducing valve 107*b* is set to 2.5 kg/cm$^2$ (2.45×10$^5$ Pa), a third reducing valve 107*c* is set to 1.5 kg/cm$^2$ (1.47×10$^5$ Pa), and a fourth reducing valve 107*d* is set to 0.5 kg/cm$^2$ (4.9×10$^4$ Pa). The air flow into the respective reducing valves 107*a* through 107*d* is controlled by opening and closing the solenoid valves 108*a* through 108*d*.

There will be described the structure of a control system according to the present embodiment.

As shown in FIGS. 13 and 14, the screw press apparatus according to the present embodiment has a first, a second, a third and a fourth control unit 89, 90, 91 and 104.

The first control unit 89 controls the drive 25 and the cleaning pump 55 in accordance with torque detected by the torque detector 52.

The first control unit 89 has a comparator 53 and a controller 54. A reference torque region having a specified range is set in the comparator 53. The comparator 53 compares the detected torque with the reference torque region. When the detected torque does not reach the reference torque region, the comparator 53 outputs a speed decrease request signal to the controller 54, and when the detected torque exceeds the reference torque region, the comparator 53 outputs a speed increase request signal to the controller 54. When the controller 54 receives the speed decrease request signal, it reduces the speed of the drive 25 for specified time, and when receiving the speed increase request signal, it increases the speed of the drive 25 for specified time.

An abnormal torque value which is higher than the reference torque region is further set in the comparator 53. The comparator 53 compares the detected torque with the abnormal torque value. When the detected torque exceeds the abnormal torque value, the comparator 53 outputs a cleaning request signal to the controller 54. The controller 54 which did not receive the cleaning request signal rotates the drive 25 in the forward direction so that the screw shaft 6 rotates in the forward direction. The controller 54 which received the cleaning request signal rotates the drive 25 in the reverse direction for a specified time so that the screw shaft 6 rotates in the reverse direction, and drives the cleaning pump 55 for a specified time so that the cleaning water is ejected from the cleaning pipe 34 onto the screen 8.

The second control unit 90 controls the pump 59 in accordance with a measured value from the turbidity measuring instrument 56.

The second control unit 90 has a comparator 57 and a controller 58. A reference value is set in the comparator 57. The comparator 57 compares the measured value detected by the turbidity measuring instrument 56 with reference value. When the measured value exceeds the reference value (the percentage of solid materials in the filtrate is too high), the comparator 57 outputs a pressure decrease request signal to the controller 58. When the controller 58 receives the pressure decrease request signal, it reduces a force-in pressure of the pump 59.

The third control unit 91 controls the pump 59 in accordance with a force-in pressure detected by the pressure detector 61.

The third control unit 91 has a comparator 62 and a controller 63. A reference pressure region having a specified range is set in the comparator 62. The comparator 62 compares an inlet pressure with the reference pressure region. When the inlet pressure exceeds the reference pressure region, the comparator 62 outputs a pressure decrease request signal to the controller 63, and when the inlet pressure does not reach the reference pressure region, the comparator 62 outputs a pressure increase request signal to the controller 63. When the controller 63 receives the pressure decrease request signal, it reduces the force-in pressure of the pump 59 for a specified time, and when receiving the pressure increase request signal, it increases the force-in pressure of the pump 59 for a specified time.

The fourth control unit 104 controls at least one of the pilot valve 103 and the drive 25 in accordance with a detected value from the detector 100.

The fourth control unit 104 has a comparator 105 and a controller 106. A standard open degree is set in the comparator 105. The comparator 105 compares the detected value with the standard open degree. When the detected value exceeds the standard open degree, the comparator 105 outputs an pressure increase request signal to the controller 106, and when the detected value does not reach the standard open degree, the comparator 105 outputs a pressure decrease request signal to the controller 106. When the controller 106 receives the pressure increase request signal, it increases the set air pressure of the regulator valve 102, and when receiving the pressure decrease request signal, it reduces the air pressure of the regulator valve 102.

For example, the state in which there are outputs from the first through third detectors 100*a* through 100*c* and there is no output from the fourth detector 100*d* is set as a state in which the detected value coincides with the standard open degree. In this case, when there are outputs from the first and second detectors 100*a* and 100*b* but there is no output from the third and fourth detector 100*c* and 100*d*, the detected value does not reach the standard open degree, and thus the pressure decrease request signal is output. The controller 106 which receives the pressure decrease request signal controls the solenoid valve 108 to reduce the set pressure in the regulator valve 102. For example, when the second reducing valve 107*b* is used (only the second solenoid valve 108*b* is opened), the controller 106 closes the second solenoid valve 108*b* as well as opens the third solenoid valve 108*c* so that the third reducing valve 107*c* is used.

Meanwhile, when there are outputs from all the first through the fourth detectors 100*a* through 100*d*, the detected value exceeds the standard open degree, and thus the pressure increase request signal is output. The controller 106 which receives the pressure increase request signal controls the solenoid valve 108 so that the set pressure in the regulator valve 102 is increased. For example, when the second reducing valve 107*b* is used (only the second solenoid valve 108*b* is opened), the controller 106 closes the second solenoid valve 108*b* as well as opens the first solenoid valve 108*a* so that the first reducing valve 107*a* is used.

A reference open degree is further set in the comparator 53. The reference open degree may be the same as or different from the standard open degree. The comparator 53 compares the detected value with the reference open degree. When the detected value exceeds the reference open degree, the comparator 53 outputs a speed increase request signal to the controller 106, and when the detected value does not reach the reference open degree, the comparator 53 outputs a speed decrease request signal to the controller 106. When the controller 106 receives the speed increase request signal, it increases the speed of the drive 25, and when receiving the speed decrease request signal, it reduces the speed of the drive 25.

There will be described below the effects of the present embodiment.

At the time of the normal filtering operation, the drive 25 rotates the screw shaft 6 in the forward direction. When the screw shaft 6 rotates in the forward direction, the piston claw 31 is not engaged with the claw 28 to allow a relative rotation of the outside tube 5 with respect to the screw shaft 6, and the piston claw 78 is engaged with the stopper 33 to prevent the relative rotation of the outside tube 5 with respect to the frames 3 and 4. As a result, the screw blade 13 rotates relative to the screen 8 in the state in which the screen 8 is stopped relative to the frames 3 and 4.

The raw liquid is fed from the raw liquid tank 94 to the coagulant mixing tank 39 by the pump 59 and flows from the raw liquid inlet 84 into the tank body 81. In the tank body 81 the raw liquid is mixed with the cohesive agent fed from at least one of the cohesive agent fed openings 86 and 87, by the agitating blade 42. When the raw liquid is mixed with the cohesive agent, flocs are generated. The raw liquid containing the flocs is fed from the raw liquid outlet 44 via the supply path 60, the supply pipe 16 and the opening 73 of the screw shaft 6 into the upstream region 71 of the cylindrical space 70 by the pump 59.

Since pulsatory actions of the raw liquid generated in the pump 59 are relieved by the compressibility of air in the tank body 81, the raw liquid is fed into the upstream region 71 without breaking flocs in the raw liquid.

The opening 83 of the tank body 81 is covered with the upper cover 82, and the gland box 48 is fitted into the through hole 88 of the upper cover 82, and the agitation shaft 40 is inserted through the gland box 48. Gaps between the agitation shaft 40 and the gland box 48 are sealed by the gland packings 46, and the lower end 51*a* of the sealed pipe 51, which extends from the lower end of the gland box 48 to cover the agitation shaft 40, is dipped in the raw liquid in the tank body 81. As a result, the sealed state is held in the tank body 81. For this reason, air in the tank body 81 shows a desirable compressibility.

If a drive pressure of the raw liquid into the screw press is set to 0.05 to 0.5 kg/cm$^2$ (about 4.9 to 49 kPa), a leakage of the raw liquid does not occur, and even in the case where sewage or the like is treated, a deodorization effect can be obtained.

The raw liquid fed into the upstream region 71 is carried towards the downstream region 72 by the screw blade 13 which rotates in the forward direction. The relative distance between the outer peripheral surface of the screw shaft 6 and the inner peripheral surface of the screen 8 corresponds to a width of the cylindrical space 70 in the radial direction, and since the width is reduced from the upstream region 71 towards the downstream region 72, the raw liquid is pressurized gradually while being carried, and the filtrate flows out of the fine holes 74 of the screen 8, to be concentrated. The raw liquid in the cylindrical space 70 becomes sludgy at the middle stage, and it is further concentrated to form a cake and is finally discharged from the downstream region 72. Namely, the raw liquid is separated into the filtrate which flows out of the fine holes 74 and the cake which is discharged from the downstream region 72.

The filtrate is discharged from the filtrate trough 36. The cake passes from the downstream region 72 of the cylindrical space 70 through the cake discharge hole 96 and the cake chute 37, to be discharged.

Since the opening 73 for supplying the raw liquid is formed in the screw shaft 6, the raw liquid is not influenced by the screw blade 13 and is fed. Therefore, even in the case where soft flocs cohered by the cohesive agent are mixed in the raw liquid, the flocs are hardly broken, and the dehydration performance is not deteriorated.

The size of fine hole 74 of the screen decreases gradually from the upstream region 71 towards the downstream region 72. On the contrary, a pressure which is applied to the raw liquid in the cylindrical space 70 rises gradually from the upstream region 71 where the width of the radial direction is large towards the downstream region 72 where the width of the radial direction is small. For this reason, in the upstream region 71 in low pressure, the filtrate flows out of large fine holes 74*a* satisfactorily. Moreover, since the fine hole 74*c* become smaller gradually towards the downstream region 72 with high pressure where the sludge is changed into a cake, the sludge hardly flows out of the fine hole 74*c* and thus only the filtrate flows out satisfactorily. Therefore, the raw liquid is separated into the filtrate and the cake satisfactorily, and thus the filtering performance is enhanced.

The sludge is scrapped off from fine holes 74 of the screen 8 periodically by the scraper 14. For this reason, the blocking of the screen 14 is prevented previously in the whole region from the upstream region 71 to the downstream region.

Since the scraper 14 extends continuously from the upstream region 71 to the downstream region 72, compared with the case where the scraper is disposed partially, and its positioning is facilitated, with a reduced tendency to have positional deviations.

When the sludge is not sufficiently dehydrated in the cylindrical space 70 and the moisture content of the cake rises, torque detected by torque detector 52 is lowered. When the detected torque does not reach the reference torque region, there is a strong possibility that the cake to be discharged from the downstream region 72 may not be sufficiently consolidated. For this reason, the speed decrease request signal is output from the comparator 53 to the controller 54. The controller 54 which receives the speed decrease request signal reduces the speed of the drive 25 for a specified time. As a result, the residence time of the raw liquid in the cylindrical space 70 is extended, and the raw liquid undergoes an adequate filtrate dehydration so that the sludge is sufficiently dehydrated. Therefore, the cake having a desired moisture content in a suitably consolidated state is discharged.

Meanwhile, when the moisture content of the cake is lowered, torque detected by the torque detector 52 rises. When the detected torque exceeds the reference torque region, there is a strong possibility that the cake to be discharged from the downstream region 72 may be consolidated excessively. For this reason, the speed increase request signal is output form the comparator 53 to the controller 54. The controller 54 which receives the speed increase request signal increases the speed of the drive 25 for a specified time. As a result, the residence time of the raw liquid in the cylindrical space 70 is shortened, and the raw liquid undergoes an adequate filtrate dehydration so that the cake having a desirable moisture content in a suitably consolidated state is discharged.

When the screen 8 is clogged and the load applied to the drive 25 increases, torque detected by the torque detector 52 increases. When the detected torque exceeds the abnormal torque value, there is a great possibility that the screen may require cleaning. For this reason, the cleaning request signal is output from the comparator 53 to the controller 54. The controller 54 which receives the cleaning request signal rotates the drive 25 in the reverse direction for specified time and drives the cleaning pump 55 for a specified time. When the drive 25 is rotated in the reverse direction, the screw shaft 6 rotates in the reverse direction. When the screw shaft 6 rotates in the reverse direction, the piston claw 31 is engaged with the claw 28 to prevent the relative rotation of the outside tube 5 with respect to the screw shaft 6, and the piston claw 78 is not engaged with the stopper 33 to allow a relative rotation of the outside tube 5 with respect to the frames 3 and 4. As a result, the outside tube 5 and the screen 8 rotate integrally with the screw shaft 6, and sludge in a consolidated state in the cylindrical space 70 is fed back. At the same time, cleaning water is ejected from the cleaning pipe 34 onto the screen 8, and thus the whole peripheral region of the screen 8 is washed and can be reused.

When the cake resides in the lower steam region 72 of the cylindrical space 70 and the a percentage of the solid material in the filtrate increases, the value measured by the measuring instrument 56 increases. When the measured value exceeds the reference value, there is a strong possibility that an residence amount of the cake may be excessive. For this reason, the pressure decrease request signal is output form the comparator 57 to the controller 58. The controller 58 which received the pressure decrease request signal reduces the force-in pressure of the pump 59, and reduces a supply pressure of the raw liquid to the cylindrical space 70. As a result, the residence of the cake is eliminated and thus the percentage of solid material in the filtrate is decreased.

In the case where the sludge in the cylindrical space 70 is not sufficiently dehydrated and it insufficiently becomes a cake, the inlet pressure of the raw liquid into the cylindrical space 70 detected by the pressure detector 61 is lowered. When the inlet pressure does not reach the reference pressure region, there is a strong possibility that a cake in a desirably consolidated state is not discharged. For this reason, the pressure increase request signal is output from the comparator 62 to the controller 63. The controller 63 which received the pressure increase request signal increases the force-in pressure of the pump 59 for specified time. As a result, the supplying amount of the raw liquid into the cylindrical space 70 increases, and the pressure in the cylindrical space 70 rises, and the sludge is sufficiently dehydrated to be concentrated so that the cake in the desirably consolidated state is discharged.

Meanwhile, in the case where the sludge in the cylindrical space 70 is abruptly dehydrated and the cylindrical space 70 is filled with the cake, the inlet pressure of the raw liquid into the cylindrical space 70 detected by the pressure detector 61 rises. When the inlet pressure exceeds the reference pressure region, there is strong possibility that the raw liquid is excessively fed because the cylindrical space 70 is filled with the cake. For this reason, the pressure decrease request signal is output from the comparator 62 to the controller 63. The controller 63 which received the pressure decrease request signal reduces the force-in pressure of the pump 59 for specified time. As a result, the supplying amount of the raw liquid into the cylindrical space 70 reduces, and thus deterioration in the throughput capacity due to the excessive supplying of the raw liquid is prevented previously.

When the cake is hardened and the moisture content is lowered, a pressing force from the cake to the presser 21 increases, and thus the degree of opening of the cake discharge hole 96 increases and the detected value from the detector 100 increases. When the detected value exceeds the standard open degree, there is strong possibility that the thickness of the cake to be discharged is remarkably increased, and thus the pressure increase request signal is output from the comparator 105 to the controller 106. The controller 106 which receives the pressure increase request signal operates the pilot valve 103 to increase the set air pressure of the regulator valve 102. As a result, the presser 21 moves, and the increase in the degree of opening of the cake discharge hole 96 is suppressed, and the cake having an uniform thickness is discharged.

In addition, when the detected value exceeds the reference open degree, there is a strong possibility that the moisture content of the cake may be remarkably lowered, and thus the speed increase request signal is output from the comparator 105 to the controller 106. The controller 106 which receives the speed increase request signal increases the speed of the drive 25 and accelerates the supplying speed of the stock liquid in the cylindrical space 70 to raise the moisture content of the cake. As a result, the moisture content of the cake to be discharged becomes stable in the constant state.

Meanwhile, when the cake is softened and the moisture content rises, a pressing force from the cake to the presser 21 is decreased, and the degree of opening of the cake discharge hole 96 is decreased so that the detected value from the detector decreases. When the detected value does not reach the standard open degree, there is a strong possibility that the thickness of the cake to be discharged may be decreased remarkably, and thus the pressure decrease request signal is output from the comparator 105 to the controller 106. The controller 106 which receives the pressure increase request signal operates the pilot valve 103 to reduce the set air pressure of the regulator valve 102. As a result, the presser 21 moves so that the reduction in the degree of opening of the cake discharge hole 96 is suppressed and the cake having uniform thickness is discharged.

In addition, when the detected value does not reach the reference open degree, there is a strong possibility that the moisture content of the cake may rise remarkably, and thus the speed decrease request signal is output from the comparator 105 to the controller 106. The controller 106 which received the speed decrease request signal reduces the speed of the drive 25 and delays the supplying speed of the raw liquid in the cylindrical space 70 so that the moisture content of the cake is lowered. As a result, the moisture constant of the cake to be discharged becomes stable in the constant state.

INDUSTRIAL APPLICABILITY

As described hitherto, a screw press apparatus according to the present invention has high filtering characteristics and prevents a blocking of a screen securely, and thus the screw press apparatus is effective for dehydration of sludge or the like.

What is claimed is:

1. A screw press apparatus, comprising:
   a first frame;
   a second frame opposing the first frame; and
   a screw press comprising:
      an outside tube supported on the first and second frames, the outside tube comprising a cylindrical punched plate and a filtering screen fixed to an inner periphery of the cylindrical punched plate;
      a screw shaft having a spiral screw blade projecting therefrom, the screw shaft being inserted through the outside tube and supported rotatably on the first and second frames;
      a supply pipe for supplying raw liquid into the screw shaft, the supply pipe being fixed to one end of the screw shaft supported on the first frame; and
      a cleaning pipe disposed outside the punched plate for ejecting cleaning water to wash the filtering screen,
      wherein the filtering screen extends between the first and second frames and has a multiplicity of fine filtering holes formed circularly for filtration of raw liquid over a whole circumference of the filtering screen,
   the screw shaft and the filtering screen are configured to define therebetween a cylindrical space continuously extending from an upstream region at a side of the first frame to a downstream region at a side of the second frame,
   the spiral screw blade extends in the cylindrical space continuously from the upstream region to the downstream region,
   the screw shaft has an opening formed in a periphery thereof for supplying raw liquid from the supply pipe to the upstream region of the cylindrical space,
   the screw shaft and the filtering screen have a radial distance therebetween decreasing from the upstream region towards the downstream region,
   raw liquid supplied from the opening to the upstream region is pressurized and carried towards the downstream region by the spiral screw blade, while being separated into filtrate outflowing from fine holes of the filtering screen and solids to be discharged as a cake from the downstream region, and
   the multiplicity of fine holes of the filtering screen have diameters gradually decreasing from the upstream region towards the downstream region.

2. The screw press apparatus according to claim 1, wherein
   the apparatus further comprises a scraper fixed to the screw blade, and
   the scraper extends continuously from the upstream region to the downstream region and contacts elastically on the screen.

3. The screw press apparatus according to claim 1, further comprising:
   a claw fixed to the supply pipe;
   a first movable claw disposed on the outside tube in correspondence to the claw;
   a first spring for biasing the first movable claw;
   a first guide surface provided on at least one of the claw and the first movable claw, to work when the screw shaft rotates in a forward direction;
   a stopper fixed to the second frame;
   a second movable claw disposed on the outside tube in correspondence to the stopper;
   a second spring for biasing the second movable claw; and
   a second guide surface provided on at least one of the stopper and the second movable claw, to work when the screw shaft rotates in a reverse direction, wherein
   the outside tube is supported rotatably on the frames,
   the first spring biases the first movable claw within a range where the claw moves according to the rotation of the screw shaft,
   the second spring biases the second movable claw within a range where the stopper moves according to the rotation of the outside tube,
   when the screw shaft rotates in the forward direction, the first movable claw is adapted by a guiding of the first guide surface to move out of the moving range of the claw against the biasing force of the first spring, allowing a relative rotation of the outside tube with respect to the screw shaft, and the second movable claw is adapted by the biasing force of the second spring to engage with the stopper, preventing relative rotation of the outside tube with respect to the frames, for the screen to be held in a stopped state relative to the frames and for raw liquid to be pressurized and carried from the upstream region to the downstream region, and
   when the screw shaft rotates in the reverse direction, the first movable claw is adapted by the biasing force of the first spring, to engage with the claw, preventing the relative rotation of the outside tube with respect to the screw shaft, and the second movable claw is adapted by a guiding of the second guide surface, to move out of the moving range of the stopper against the biasing force of the second spring, allowing the relative rotation of the outside tube with respect to the frames, for the outside tube to be rotated integrally with the screw shaft.

4. The screw press apparatus according to claim 1, further comprising:
   a pump for supplying the raw liquid;
   a supply path for interconnecting the supply pipe and the pump; and
   a coagulant mixing tank provided in the supply path, wherein the coagulant mixing tank has a tank body, an upper cover, a gland box, a gland packing, a seal pipe, and an agitation shaft, the tank body has an opening, a raw liquid inlet, a raw liquid outlet, and a cohesive agent supply opening, the raw liquid outlet is disposed below the opening, the raw liquid inlet and the cohesive agent supply opening are disposed below the raw liquid outlet, the opening is covered with the upper cover, the upper cover has a through hole into which the gland box is fitted, the agitation shaft is inserted through the gland box, the glad packing performs a sealing between the agitation shaft and the gland box, the agitation shaft has an agitating blade disposed below the raw liquid outlet in the tank body, the sealed pipe extends from a lower end of the gland box to cover the agitation shaft, and a lower end of the sealed pipe is dipped in raw liquid in the tank body.

5. The screw press apparatus according to claim 1, further comprising:

a drive for driving the screw shaft;

a torque detector provided for the drive; and a control unit for controlling the drive in accordance with detected torque detected by the torque detector.

6. The screw press apparatus according to claim 5, wherein the control unit has a comparator and a controller, the drive comprises a variable speed motor, a reference torque region having a specified range is set in the comparator, the comparator compares the detected torque with the reference torque region, and when the detected torque does not reach the reference torque region, the comparator outputs a speed decrease request signal to the controller, and when the detected torque exceeds the reference torque region, the comparator outputs a speed increase request signal to the controller, and when the controller receives the speed decrease request signal, the controller has the drive decrease in speed for a specified time, and when the controller receives the speed increase request signal, the controller has the drive increase in speed for a specified time.

7. The screw press apparatus according to claim 3, further comprising:

a cleaning pump for supplying cleaning water to the cleaning pipe;

a drive for driving the screw shaft;

a torque detector provided for the drive; and a control unit for controlling the drive and the cleaning pump in accordance with detected torque detected by the torque detector.

8. The screw press apparatus according to claim 7, wherein the control unit has a comparator and a controller, the drive comprises a reversible motor, an abnormal torque value is set in the comparator, the comparator compares the detected torque with the abnormal torque value, and when the detected torque exceeds the abnormal torque value, the comparator outputs a cleaning request signal to the controller, when the controller is not given the cleaning request signal, the controller rotates the drive in the forward direction to have the screw shaft rotate in the forward direction, and when the controller receives the cleaning request signal, the controller rotates the drive in the reverse direction for a specified time to have the screw shaft rotate in the reverse direction, and drives the cleaning pump for a specified time to have the cleaning water ejected from the cleaning pipe to the screen.

9. The screw press apparatus according to claim 1, further comprising:

a pump for supplying raw liquid to the supply pipe;

a measuring instrument for measuring a percentage of a solid material in the filtrate flowing out of the screen; and a control unit for controlling the pump in accordance with a measured value from the measuring instrument.

10. The screw press apparatus according to claim 9, wherein the control unit has a comparator and a controller, a reference value is set in the comparator, the comparator compares the measured value with the reference value, and when the measured value exceeds the reference value, the comparator outputs a pressure decrease request signal to the controller, and when the controller receives the pressure decrease request signal, the controller reduces a force-in pressure of the pump.

11. The screw press apparatus according to claim 1, further comprising:

a pump for supplying raw liquid;

a supply path for interconnecting the supply pipe and the pump;

a pressure detector provided in the supply path, for detecting an inlet pressure of raw liquid to the cylindrical space; and a control unit for controlling the pump in accordance with the inlet pressure detected by the pressure detector.

12. The screw press apparatus according to claim 11, wherein the control unit has a comparator and a controller, a reference pressure region having a specified range is set in the comparator, the comparator compares the inlet pressure with the reference pressure region, and when the inlet pressure exceeds the reference pressure region, the comparator outputs a pressure decrease request signal to the controller, and when the inlet pressure does not reach the reference pressure region, the comparator outputs a pressure increase request signal to the controller, and when the controller receives the pressure decrease request signal, the controller decreases a force-in pressure of the pump a for specified time, and when the controller receives the pressure increase request signal, the controller increases the force-in pressure of the pump for a specified time.

13. The screw press apparatus according to claim 1, further comprising:

a cake discharge hole for a cake to be pushed therethrough out of the cylindrical space;

an air cylinder fixed to the second frame;

a presser connected to a shaft of the air cylinder and adapted for forward and backward movements to change the open degree of the cake discharge hole;

a detector provided for the air cylinder, for detecting the open degree;

an air supply path connected to the air cylinder;

a regulator valve provided in the air supply path;

a pilot valve for changing a set air pressure of the regulator valve; and a control unit for operating the pilot valve in accordance with a detected value from the detector.

14. The screw press apparatus according to claim 13, wherein the control unit has a comparator and a controller, a standard open degree is set in the comparator, the comparator compares the detected value with the standard open degree, and when the detected value exceeds the standard open degree, the comparator outputs a pressure increase request signal to the controller, and when the detected value does not reach the standard open degree, the comparator outputs a pressure decrease request signal to the controller, and when the controller receives the pressure increase request signal, the controller increases the set air pressure of the regulator valve, and when the controller receives the pressure decrease signal, the controller decreases the set air pressure of the regulator valve.

15. The screw press apparatus according to claim 1, further comprising:

a cake discharge hole for a cake to be pushed therethrough out of the cylindrical space;

an air cylinder fixed to the second frame;

a presser connected to a shaft of the air cylinder and adapted for forward and backward movements to change the open degree of the cake discharge hole;

a detector provided for the air cylinder, for detecting the open degree; and a control unit for controlling the drive in accordance with the detected value from the detector.

16. The screw press apparatus according to claim 15, wherein the control unit has a comparator and a controller, the drive comprises a variable speed motor, a reference open degree is set in the comparator, the comparator compares the detected value with the reference open degree, and when the detected value exceeds the reference open degree, the comparator outputs a speed increase request signal to the controller, and when the detected value does not reach the reference open degree, the comparator outputs a speed decrease request signal to the controller, and when the controller receives the speed increase request signal, the controller has the drive increase in speed, and when the controller receives the speed decrease request signal, the controller has the drive decrease in speed.

17. A screw press apparatus, comprising:

a first frame;

a second frame opposing the first frame; and a screw press comprising:

an outside tube supported on the first and second frames, the outside tube comprising a cylindrical punched plate and a filtering screen fixed to an inner periphery of the cylindrical punched plate a screw shaft having a spiral screw blade projecting therefrom, the screw shaft being inserted through the outside tube and supported rotatably on the first and second frames;

a supply pipe for supplying raw liquid into the screw shaft, the supply pipe being fixed to one end of the screw shaft supported on the first frame; and a cleaning pipe for ejecting cleaning water to wash the filtering screen, wherein the filtering screen is disposed between the first and second frames and has a plurality of fine filtering holes, the screw shaft and the filtering screen are configured to define therebetween a cylindrical space continuously extending from an upstream region at a side of the first frame to a downstream region at a side of the second frame, the spiral screw blade extends in the cylindrical space continuously from the upstream region to the downstream region, the screw shaft has an opening formed in a periphery thereof for supplying raw liquid from the supply pipe to the upstream region of the cylindrical space, the screw shaft and the filtering screen have a radial distance therebetween decreasing from the upstream region towards the downstream region, raw liquid supplied from the opening to the upstream region is pressurized and carried towards the downstream region by the spiral screw blade, while being separated into filtrate outflowing through fine holes of the filtering screen and solids to be discharged as a cake from the downstream region, and the plurality of fine holes of the filtering screen decrease in size gradually from the upstream region towards the downstream region, wherein the screw press apparatus further comprises:

a drive for driving the screw shaft;

a torque detector provided for the drive; and a control unit for controlling the drive in accordance with detected torque detected by the torque detector, wherein the control unit has a comparator and a controller, the drive comprises a variable speed motor, the comparator has a reference torque region set therein, the comparator compares the detected torque with the reference torque region, and when the detected torque does not reach the reference torque region, the comparator outputs a speed decrease request signal to the controller, and when the detected torque exceeds the reference torque region, the comparator outputs a speed increase request signal to the controller, and when the controller receives the speed decrease request signal, the controller controls the drive to decrease in speed, and when the controller receives the speed increase request signal, the controller controls the drive to increase in speed.

18. A screw press apparatus, comprising:

a first frame;

a second frame opposing the first frame; and a screw press comprising:

an outside tube supported on the first and second frames, the outside tube having a filtering screen constituting a periphery thereof;

a screw shaft having a spiral screw blade projecting therefrom, the screw shaft being inserted through the outside tube and supported rotatably on the first and second frames;

a supply pipe for a continuous supply of raw liquid into the screw shaft, the supply pipe being fixed to one end of the screw shaft supported on the first frame; and a cleaning pipe for ejecting cleaning water to wash the filtering screen, wherein the filtering screen is disposed between the first and second frames and has a plurality of fine filtering holes, the screw shaft and the filtering screen are configured to define therebetween a cylindrical space continuously extending from an upstream region at a side of the first frame to a downstream region at a side of the second frame, the spiral screw blade extends in the cylindrical space continuously from the upstream region to the downstream region, the screw shaft has an opening formed in a periphery thereof for supplying raw liquid from the supply pipe to the upstream region of the cylindrical space, the screw shaft and the filtering screen have a radial distance therebetween decreasing from the upstream region towards the downstream region, during the continuous supply, raw liquid is continuously supplied from the opening to the upstream region and pressurized and carried towards the downstream region by the spiral screw blade, while being continuously separated into filtrate outflowing through fine holes of the filtering screen and solids to be discharged as a cake from the downstream region, and the plurality of fine holes of the filtering screen decrease in size gradually from the upstream region towards the downstream region, wherein the screw press apparatus further comprises:

a pump adapted for the continuous supply of raw liquid;

a supply path for interconnecting the supply pipe and the pump;

a pressure detector provided in the supply path, for detecting an inlet pressure of raw liquid to the cylindrical space; and a control unit for controlling the pump in accordance with the inlet pressure detected by the pressure detector.

19. The screw press apparatus according to claim 18, wherein the control unit has a comparator and a controller, the comparator has a reference pressure region set therein, the comparator compares the inlet pressure with the reference pressure region, and when the inlet pressure exceeds the reference pressure region, the comparator outputs a pressure decrease request signal to the controller, and when the inlet pressure does not reach the reference pressure region, the comparator outputs a pressure increase request signal to the controller, and when the controller receives the pressure decrease request signal, the controller decreases a force-in pressure of the pump, and when the controller receives the pressure increase request signal, the controller increases the force-in pressure of the pump.

20. A screw press apparatus, comprising:

a first frame;

a second frame opposing the first frame; and a screw press comprising:

an outside tube supported on the first and second frames, the outside tube having a filtering screen constituting a periphery thereof;

a screw shaft having a spiral screw blade projecting therefrom, the screw shaft being inserted through the outside tube and supported rotatably on the first and second frames;

a supply pipe for supplying raw liquid into the screw shaft, the supply pipe being fixed to one end of the screw shaft supported on the first frame; and a cleaning pipe for ejecting cleaning water to wash the filtering screen, wherein the filtering screen is disposed between the first and second frames and has a plurality of fine filtering holes, the screw shaft and the filtering screen are configured to define therebetween a cylindrical space continuously extending from an upstream region at a side of the first frame to a downstream region at a side of the second frame, the screw blade extends in the cylindrical space continuously from the upstream region to the downstream region, the screw shaft has an opening formed in a periphery thereof for supplying raw liquid from the supply pipe to the upstream region of the cylindrical space, the screw shaft and the filtering screen have a radial distance therebetween decreasing from the upstream region towards the downstream region, raw liquid supplied from the opening to the upstream region is pressurized and carried towards the downstream region by the spiral screw blade, while being separated into filtrate outflowing from fine holes of the filtering screen and solids to be discharged as a cake from the downstream region, and the plurality of fine holes of the filtering screen decrease in size gradually from the upstream region towards the downstream region, wherein the screw press apparatus further comprises:

a cake discharge hole for the cake to be pushed therethrough out of the cylindrical space;

an air cylinder fixed to the second frame;

a presser connected to a shaft of the air cylinder and adapted for forward and backward movements to change an open degree of the cake discharge hole;

a detector provided for the air cylinder for detecting the open degree;

an air supply path connected to the air cylinder;

a regulator valve provided in the air supply path;

a pilot valve for changing a set air pressure of the regulator valve; and a control unit for operating the pilot valve in accordance with a detected value from the detector.

21. A screw press apparatus, comprising:

first and second frames in opposition to each other;

an outside tube having a screen on a peripheral surface thereof, the outside tube being supported on the frames;

a screw shaft having a spiral screw blade, the screw shaft being inserted through the outside tube and supported rotatably on the frames;

a supply pipe for supplying raw liquid into the screw shaft, the supply pipe being fixed to one end of the screw shaft supported on the first frame; and a cleaning pipe for ejecting cleaning water onto the screen, wherein the screen is disposed between the frames and has a plurality of fine holes, the screw shaft and the screen define a cylindrical space continuously extending from an upstream region at a side of the first frame to a downstream region at a side of the second frame, the screw blade is projected from the screw shaft into the cylindrical space and continuously extends from the upstream region to the downstream region, an opening for supplying raw liquid from the supply pipe to the upstream region of the cylindrical space is formed in the screw shaft, a relative distance between an outer peripheral surface of the screw shaft and an inner peripheral surface of the screen decreases from the upstream region towards the downstream region, raw liquid fed from the opening to the upstream region is pressurized and carried towards the downstream region by the screw blade, while being separated into filtrate allowed to outflow through the fine holes of the screen and a cake allowed to move in the cylindrical space to be discharged from the downstream region, and sizes of the fine holes of the screen decrease gradually from the upstream region towards the downstream region, wherein the screw press apparatus further comprises:
- a cake discharge hole for a cake to be pushed therethrough out of the cylindrical space;
- an air cylinder fixed to the second frame;
- a presser connected to a shaft of the air cylinder and adapted for forward and backward movements to change an open degree of the cake discharge hole;
- a detector provided for the air cylinder, for detecting the open degree;
- an air supply path connected to the air cylinder;
- a regulator valve provided in the air supply path;
- a pilot valve for changing a set air pressure of the regulator valve; and
- a control unit for operating the pilot valve in accordance with a detected value from the detector, wherein
    - the control unit has a comparator and a controller,
    - a standard open degree is set in the comparator,
    - the comparator compares the detected value with the standard open degree, and when the detected value exceeds the standard open degree, the comparator outputs a pressure increase request signal to the controller, and when the detected value does not reach the standard open degree, the comparator outputs a pressure decrease request signal to the controller, and
    - when the controller receives the pressure increase requests signal, the controller increases the set air pressure of the regulator valve, and when the controller receives the pressure decrease signal, the controller decreases the set air pressure of the regulator valve.

22. A screw press apparatus, comprising:

first and second frame in opposition to each other;

an outside tube having a screen on a peripheral surface thereof, the outside tube being supported on the frames;

a screw shaft having a spiral screw blade, the screw shaft being inserted through the outside tube and supported rotatably on the frames;

a supply pipe for supplying raw liquid into the screw shaft, the supply pipe being fixed to one end of the screw shaft supported on the first frame; and a cleaning pipe for ejecting cleaning water onto the screen, wherein the screen is disposed between the frames and has a plurality of fine holes, the screw shaft and the screen define a cylindrical space continuously extending from an upstream region at a side of the first frame to a downstream region at a side of the second frame, the screw blade is projected from the screw shaft into the cylindrical space and continuously extends from the upstream region to the downstream region, an opening for supplying the raw liquid from the supply pipe to the upstream region of the cylindrical space is formed in the screw shaft, a relative distance between an outer peripheral surface of the screw shaft and an inner peripheral surface of the screen decreases from the upstream region towards the downstream region, raw liquid fed from the opening to the upstream region is pressurized and carried towards the downstream region by the screw blade, while being separated into filtrate allowed to outflow through the fine holes of the screen and a cake allowed to move in the cylindrical space to be discharged from the downstream region, and sizes of the fine holes of the screen decrease gradually from the upstream region towards the downstream region, wherein the screw press apparatus further comprises:
- a cake discharge hole for the cake to be pushed therethrough out of the cylindrical space;
- an air cylinder fixed to the second frame;
- a presser connected to a shaft of the air cylinder and adapted for forward and backward movements to change an open degree of the cake discharge hole;
- a detector provided for the air cylinder for detecting the open degree; and
- a control unit for controlling the drive in accordance with the detected value from the detector.

23. The screw press apparatus according to claim 22, wherein the control unit has a comparator and a controller, the drive comprises a variable speed motor, a reference open degree is set in the comparator, the comparator compares the detected value with the reference open degree, and when the detected value exceeds the reference open degree, the comparator outputs a speed increase request signal to the controller, and when the detected value does not reach the reference open degree, the comparator outputs a speed decrease request signal to the controller, and when the controller receives the speed increase request signal, the controller has the drive increase in speed, and when the controller receives the speed decrease request signal, the controller has the drive decrease in speed.

* * * * *

UNITED STATES PATENT AND TRADEMARK OFFICE
CERTIFICATE OF CORRECTION

PATENT NO.     : 6,615,710 B1  
DATED          : September 9, 2003  
INVENTOR(S)    : E. Ishigaki et al.

It is certified that error appears in the above-identified patent and that said Letters Patent is hereby corrected as shown below:

<u>Column 24,</u>
Line 54, "a for" should be -- for a --.

Signed and Sealed this

Twenty-fourth Day of February, 2004

JON W. DUDAS
*Acting Director of the United States Patent and Trademark Office*